(12) United States Patent
Sawai

(10) Patent No.: US 12,313,965 B2
(45) Date of Patent: May 27, 2025

(54) ILLUMINATION DEVICE AND DISPLAY APPARATUS

(71) Applicant: SONY GROUP CORPORATION, Tokyo (JP)

(72) Inventor: Hiromi Sawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 17/757,696

(22) PCT Filed: Dec. 18, 2020

(86) PCT No.: PCT/JP2020/047366
§ 371 (c)(1),
(2) Date: Jun. 17, 2022

(87) PCT Pub. No.: WO2021/132059
PCT Pub. Date: Jul. 1, 2021

(65) Prior Publication Data
US 2023/0020225 A1   Jan. 19, 2023

(30) Foreign Application Priority Data
Dec. 25, 2019  (JP) .................................. 2019-234675

(51) Int. Cl.
*G03B 21/20* (2006.01)
(52) U.S. Cl.
CPC ..... *G03B 21/2066* (2013.01); *G03B 21/2073* (2013.01)
(58) Field of Classification Search
CPC .................. G03B 21/2066; G03B 21/2073
(Continued)

(56) References Cited

U.S. PATENT DOCUMENTS

2009/0296047 A1  12/2009  Maeda
2011/0279780 A1*  11/2011  Saitou .................... G03B 21/28
                                              353/20
(Continued)

FOREIGN PATENT DOCUMENTS

CA       2999353 A1    4/2017
CN     108141574 A     6/2018
(Continued)

OTHER PUBLICATIONS

Translation of 3613049 (Year: 2024).*
(Continued)

*Primary Examiner* — Jerry L Brooks
(74) *Attorney, Agent, or Firm* — CHIP LAW GROUP

(57) ABSTRACT

An illumination device according to the present disclosure includes a first light source that outputs first illumination light subjected to phase modulation to have desired intensity distribution, a second light source that outputs second illumination light; an integrator optical system that uniformizes intensity distribution of the second illumination light, a polarization conversion element that aligns polarization directions of incident light in one polarization direction, and a reflection element disposed on an optical path between the integrator optical system and the polarization conversion element. The reflection element multiplexes the first illumination light and the second illumination light and causes each of the first illumination light and the second illumination light to enter the polarization conversion element.

12 Claims, 22 Drawing Sheets

(58) Field of Classification Search
USPC .......................................................... 353/20
See application file for complete search history.

(56) References Cited

U.S. PATENT DOCUMENTS

| | | |
|---|---|---|
| 2017/0099466 A1 | 4/2017 | Damberg et al. |
| 2019/0146320 A1 | 5/2019 | Pertierra |

FOREIGN PATENT DOCUMENTS

| | | | | |
|---|---|---|---|---|
| EP | 2128695 A2 | 12/2009 | | |
| EP | 3360320 A1 * | 8/2018 | ........... | H04N 9/3105 |
| EP | 3360320 B1 * | 3/2024 | ........... | H04N 9/3105 |
| JP | 2000206464 A | 7/2000 | | |
| JP | 2004-309667 A | 11/2004 | | |
| JP | 3613049 B2 * | 1/2005 | | |
| JP | 2009-288408 A | 12/2009 | | |
| JP | 2018-060042 A | 4/2018 | | |
| JP | 2018-532152 A | 11/2018 | | |
| WO | 2017/059537 A1 | 4/2017 | | |
| WO | WO-2019225052 * | 11/2019 | ........... | H04N 9/3105 |
| WO | WO-2019225052 A1 | 11/2019 | | |

OTHER PUBLICATIONS

International Search Report and Written Opinion of PCT Application No. PCT/JP2020/047366, issued on Mar. 9, 2021, 09 pages of ISRWO.

* cited by examiner

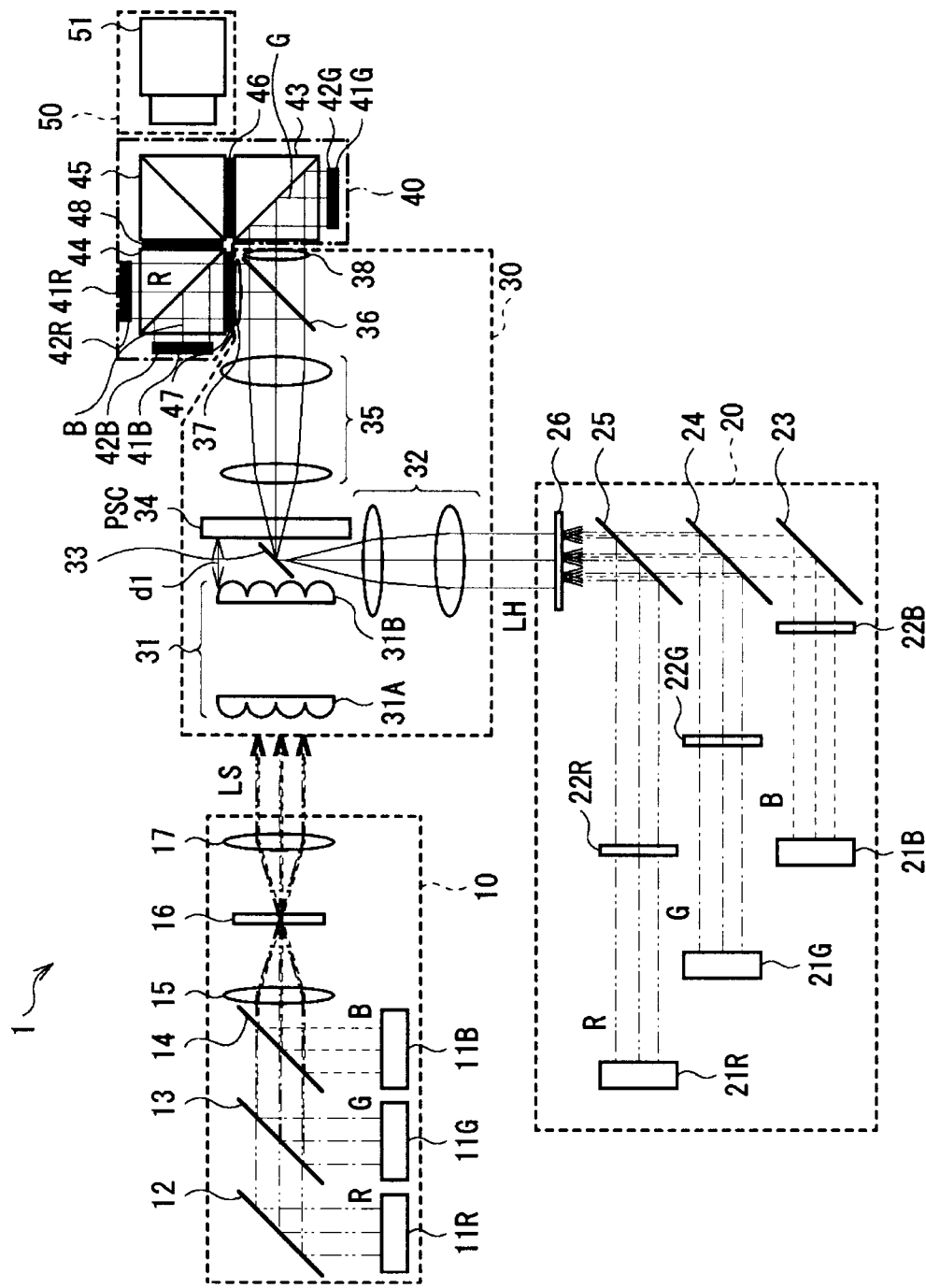
[FIG. 1]

[FIG. 2]
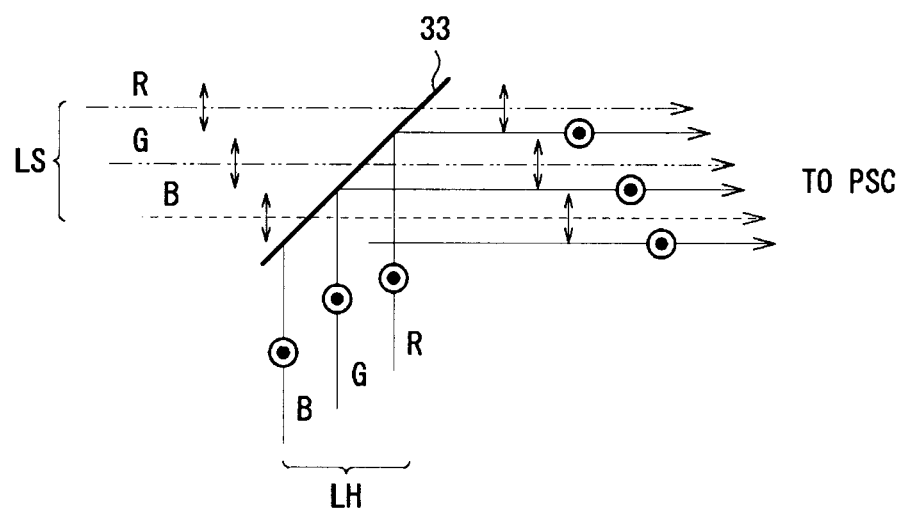
⊙ : S-POLARIZED LIGHT
↕ : P-POLARIZED LIGHT

[FIG. 3]
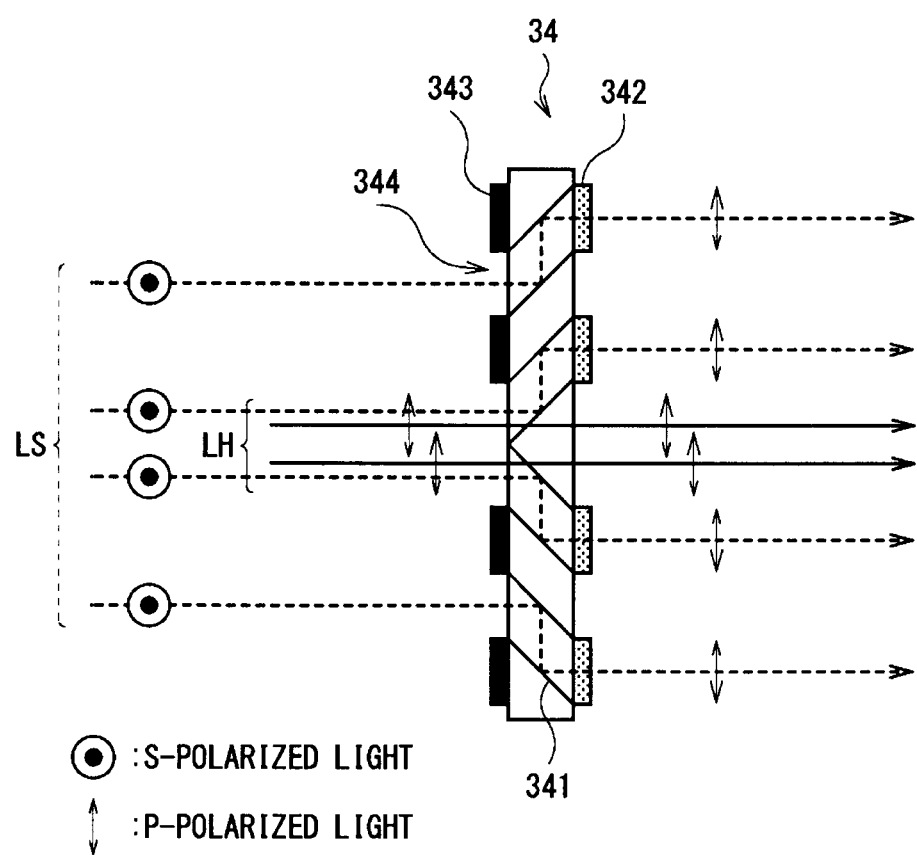

[FIG. 4]
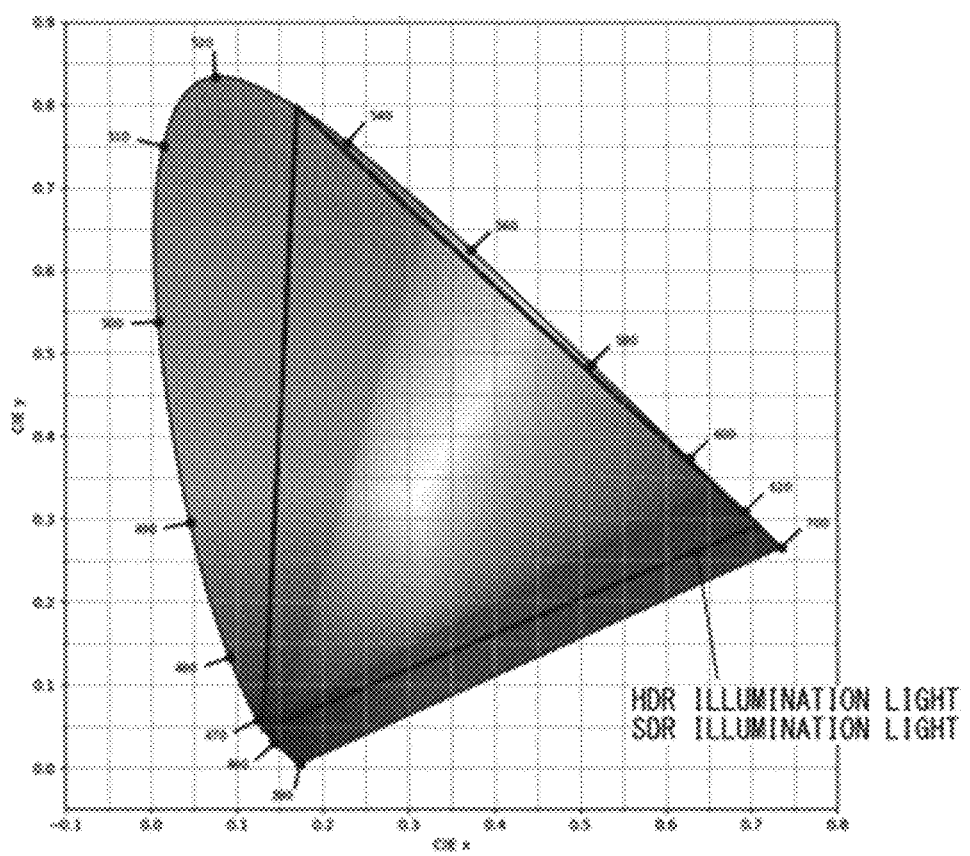

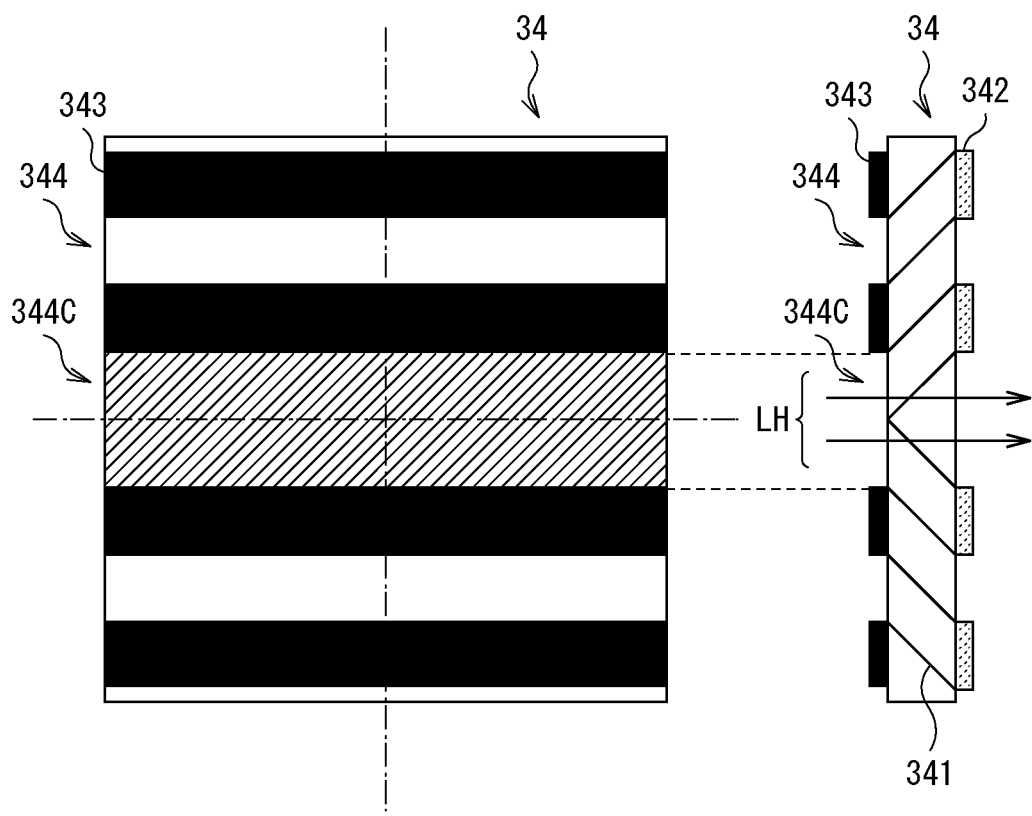
[FIG. 5A] [FIG. 5B]

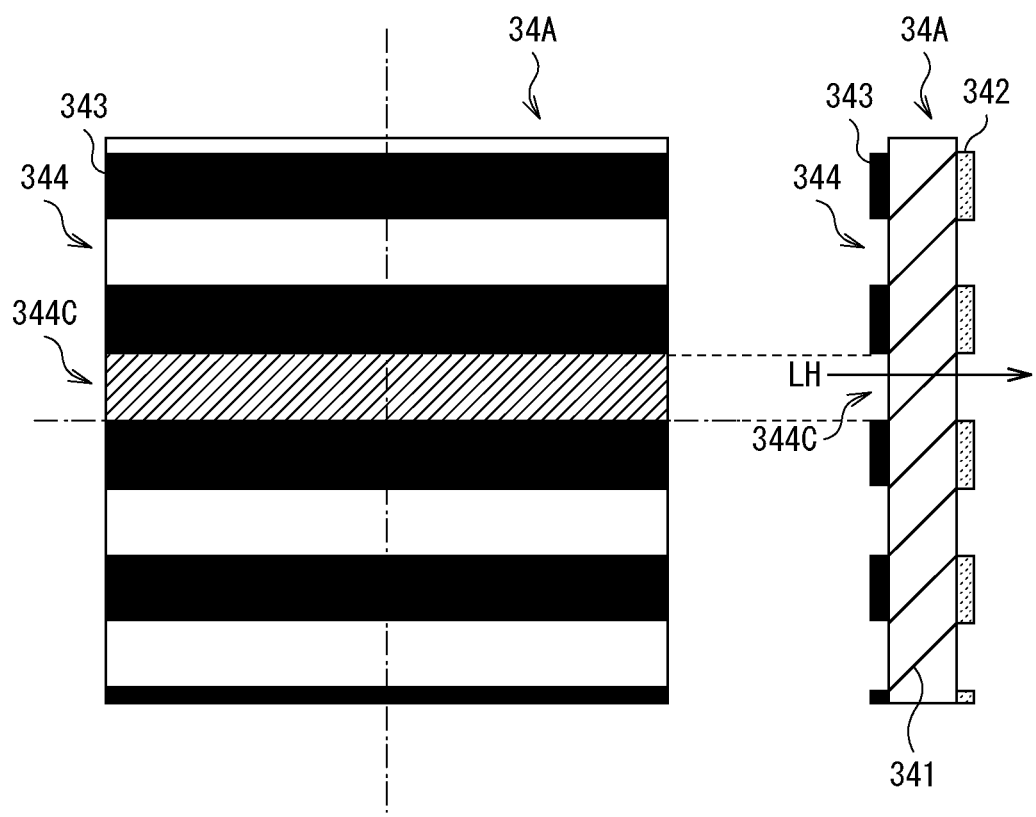
[FIG. 6A]   [FIG. 6B]

[FIG. 7]
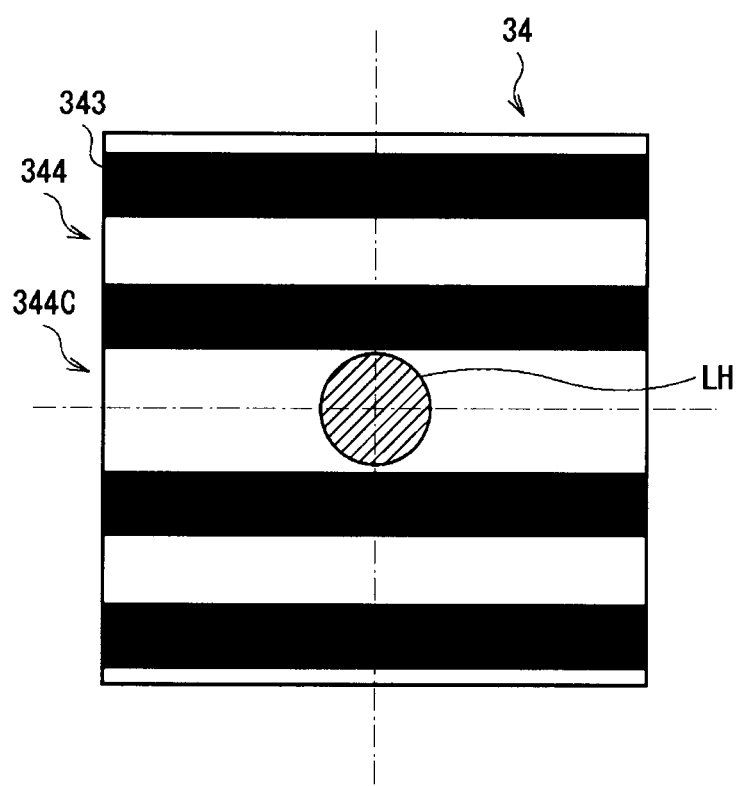

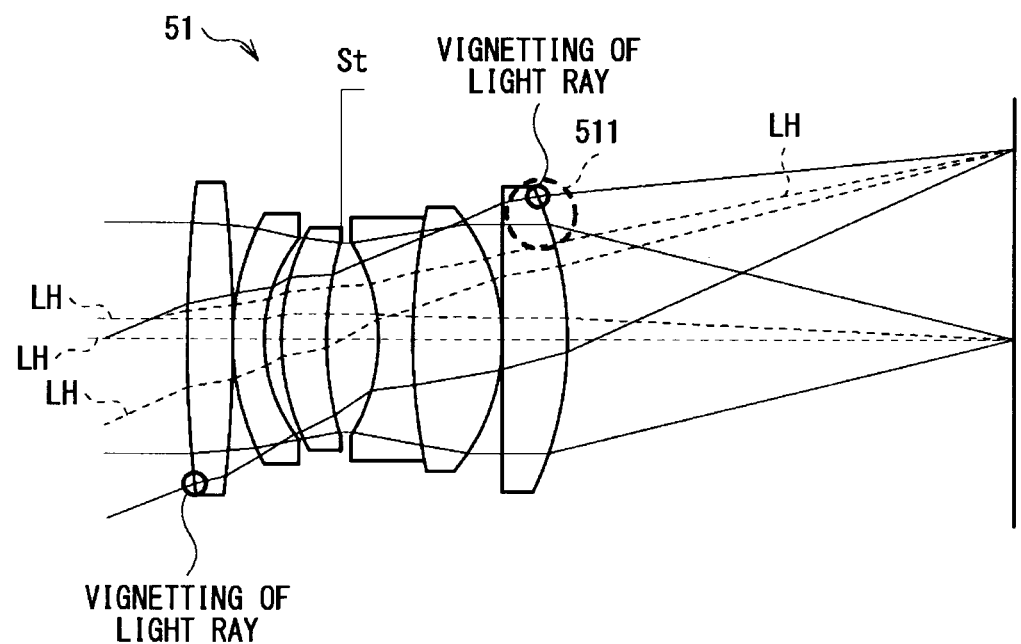
[FIG. 8]

[FIG. 9]
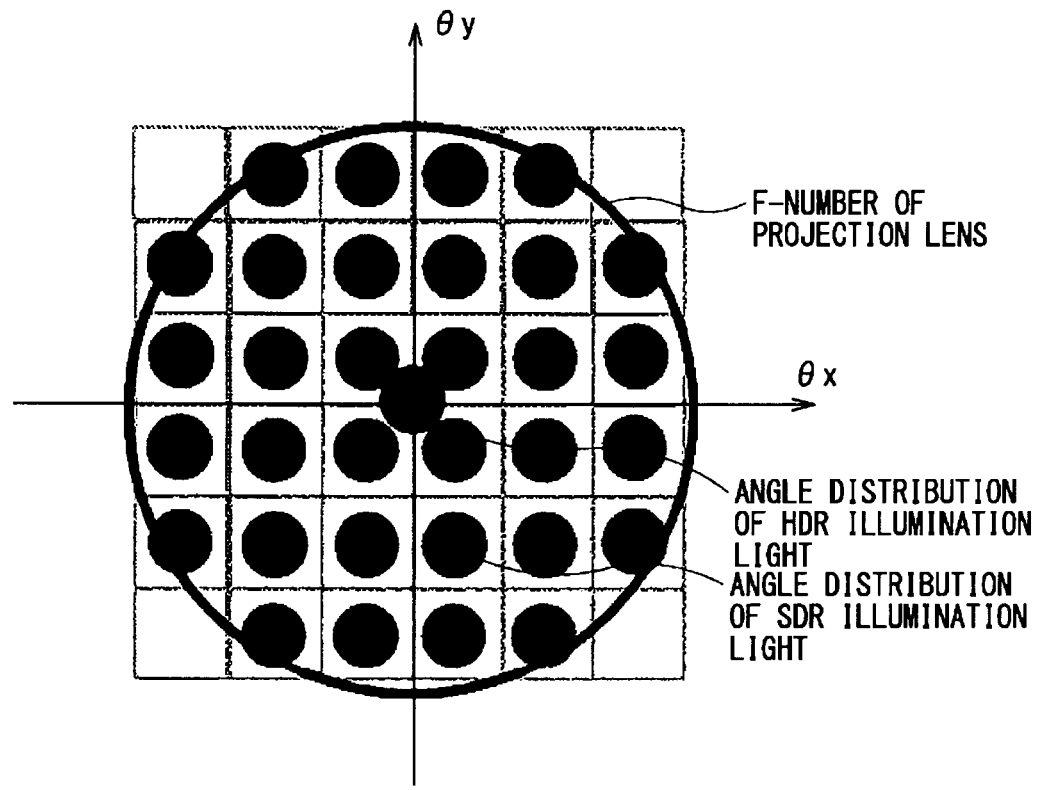

[FIG. 10]
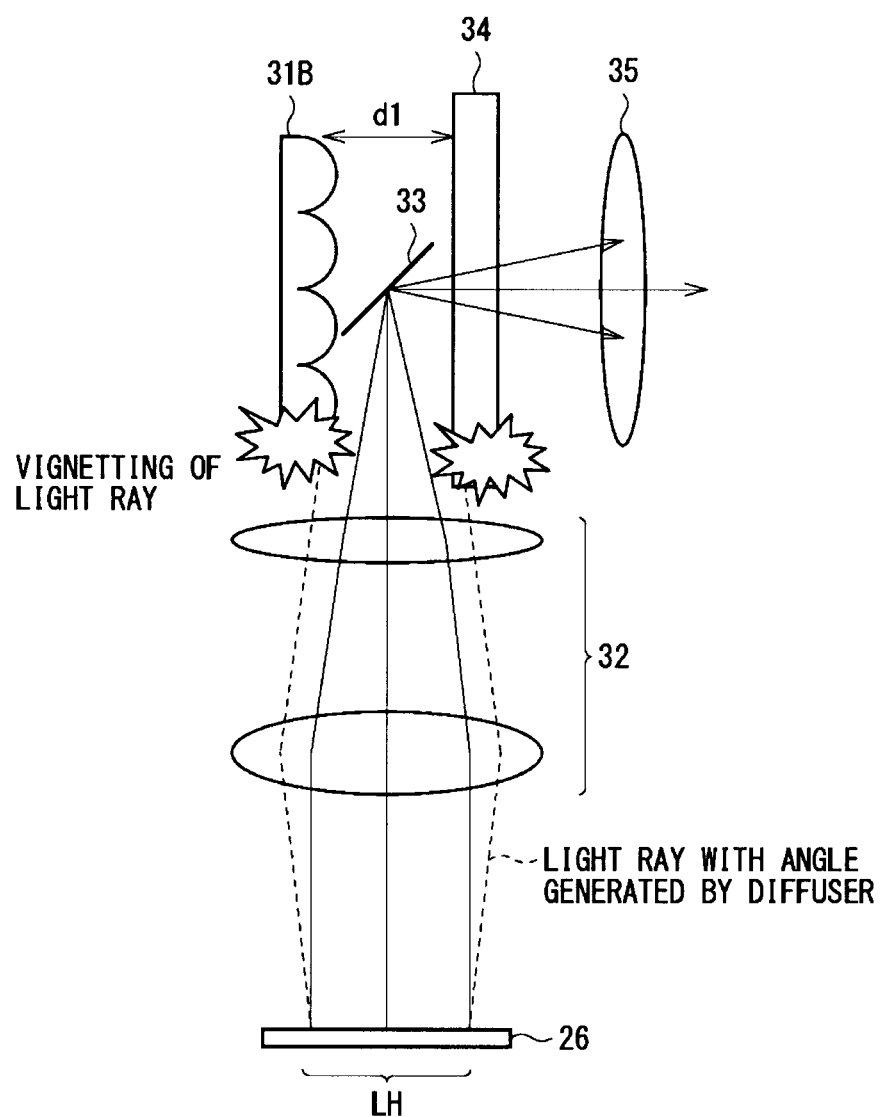

[FIG. 11]
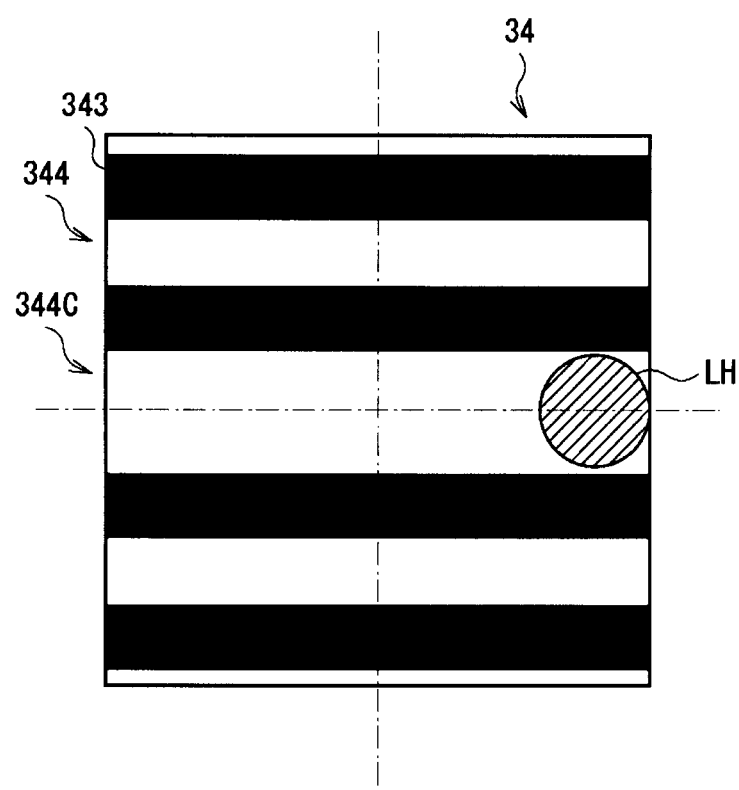

[FIG. 12]
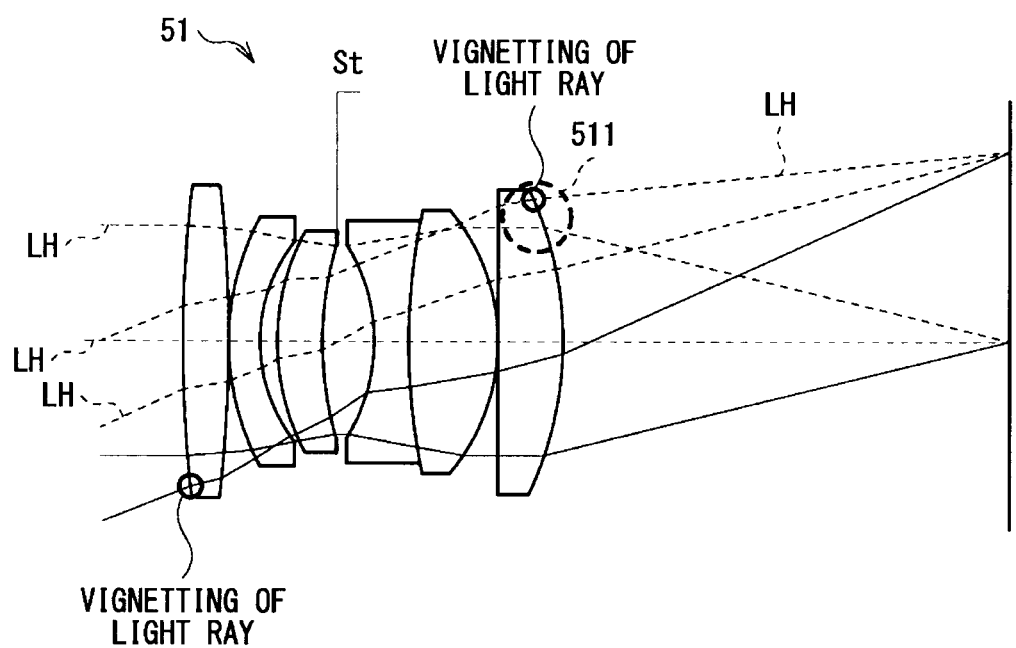

[FIG. 13]
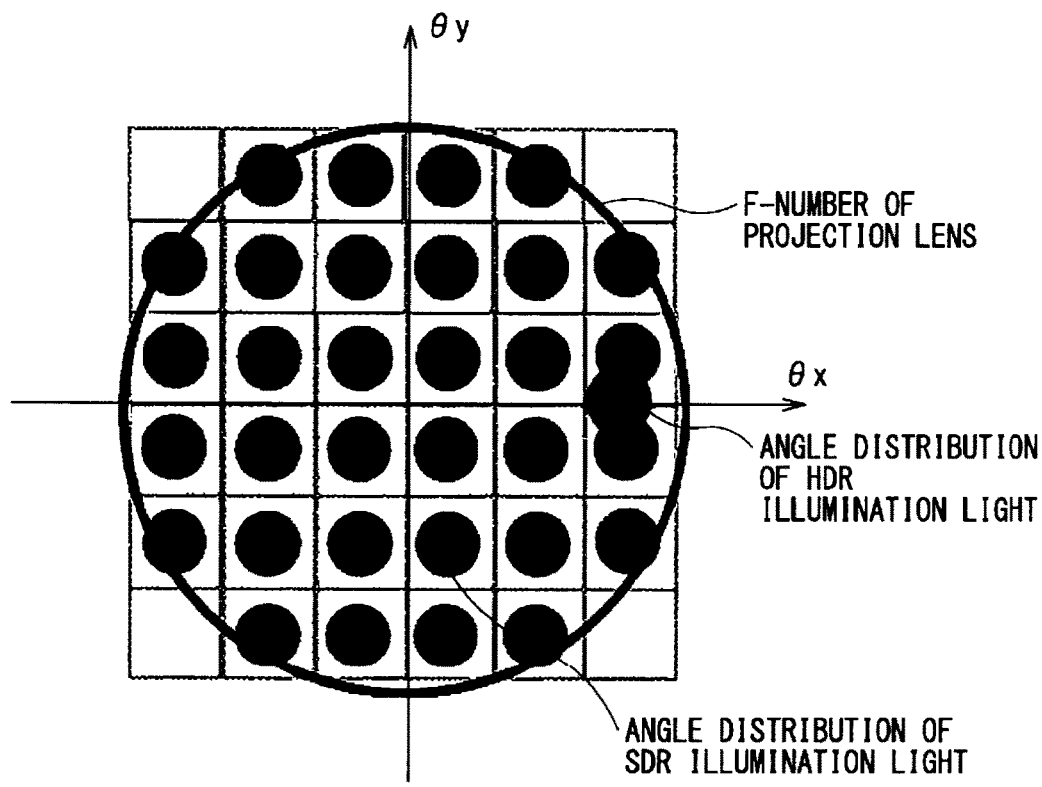

[FIG. 14]
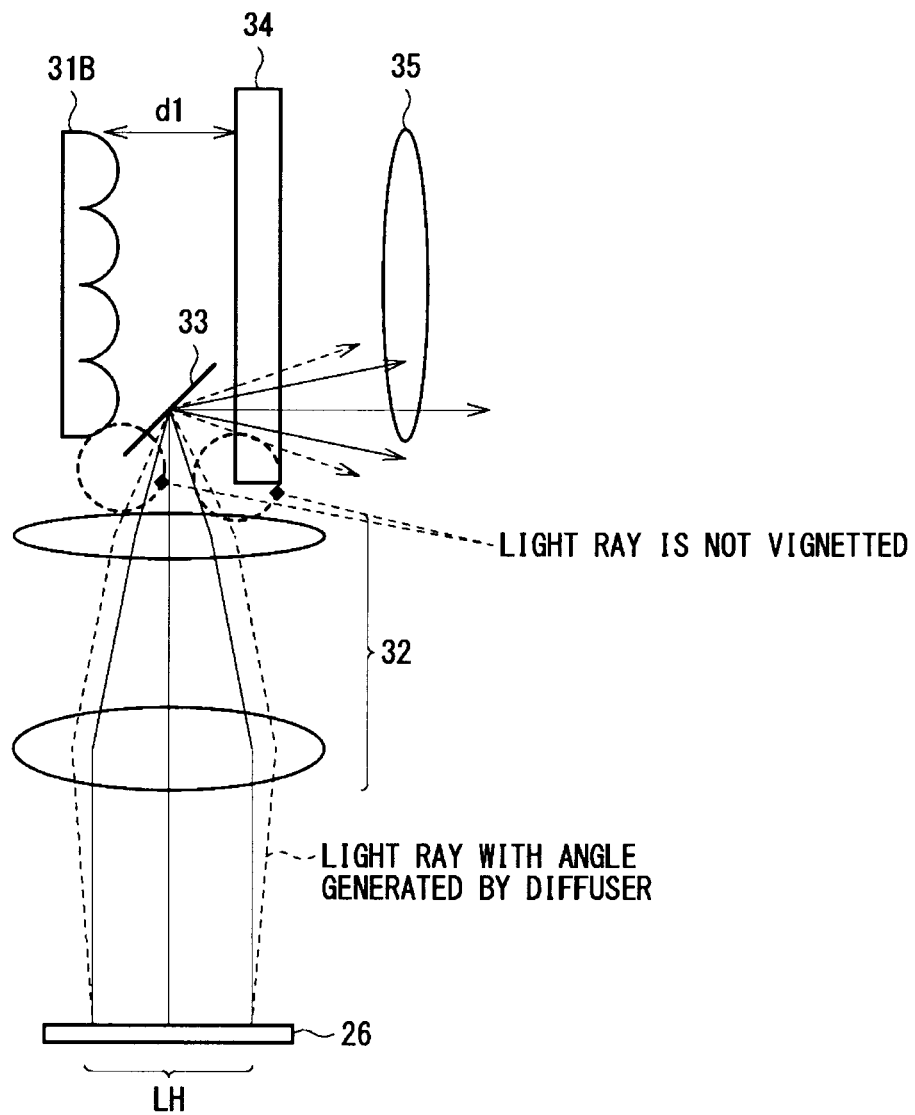

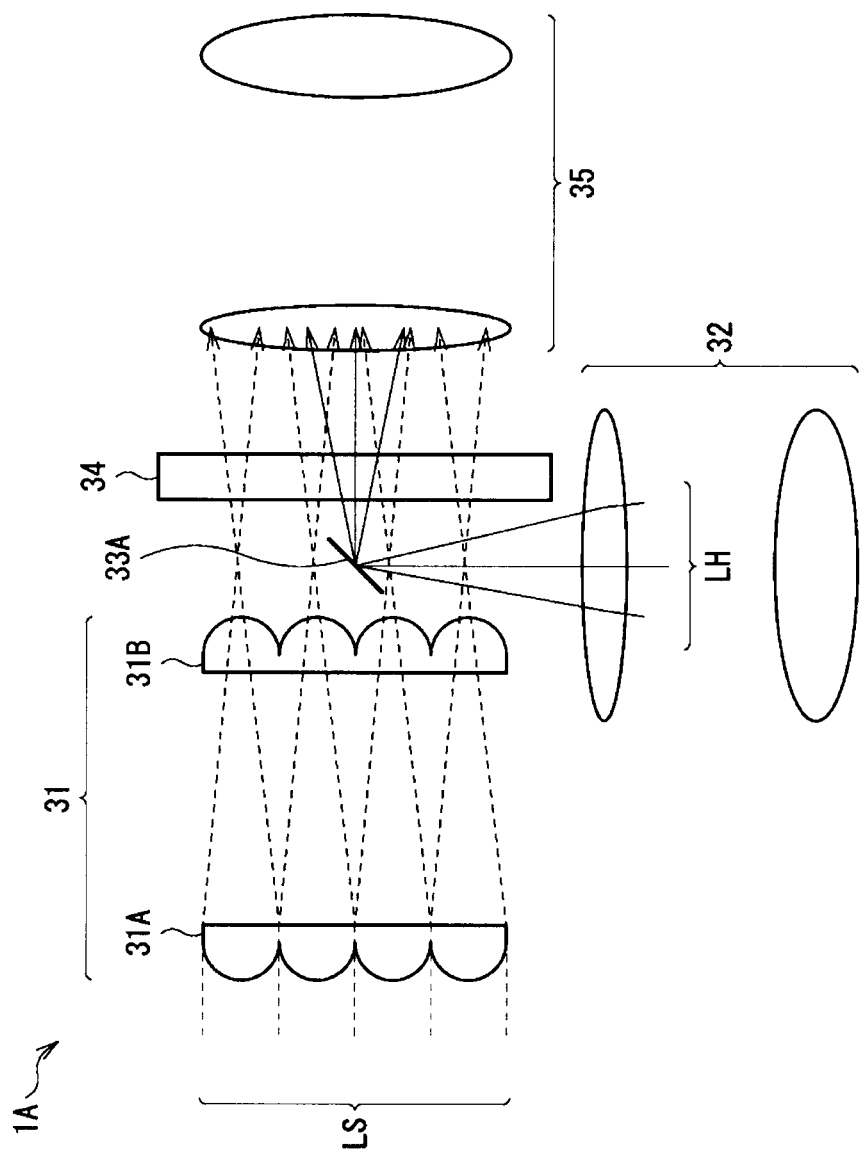
[FIG. 15]

[FIG. 16]
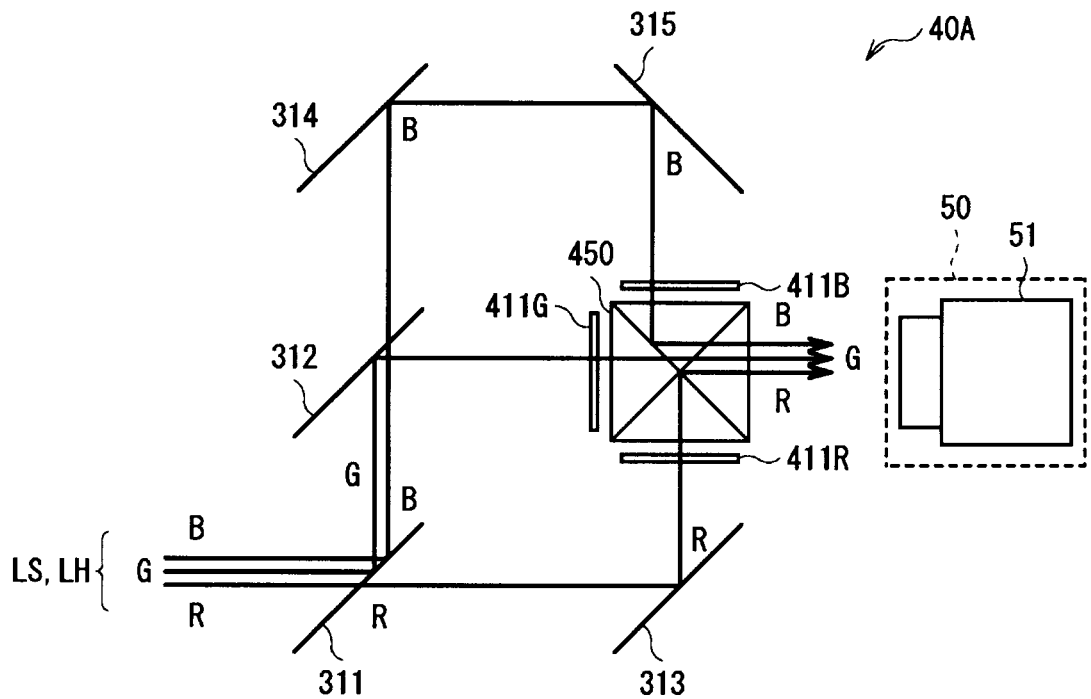
[FIG. 17]
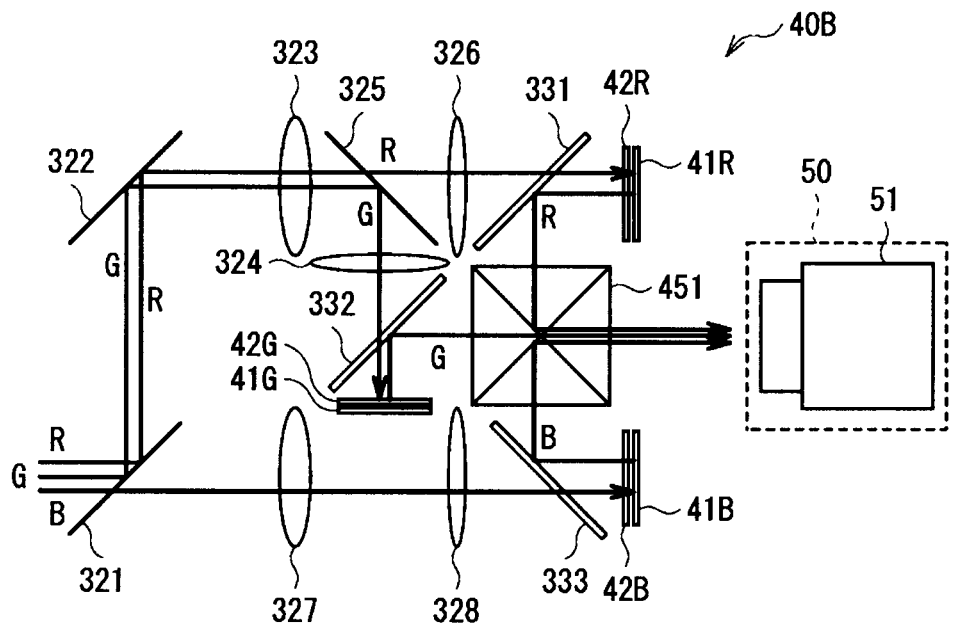

[FIG. 18]
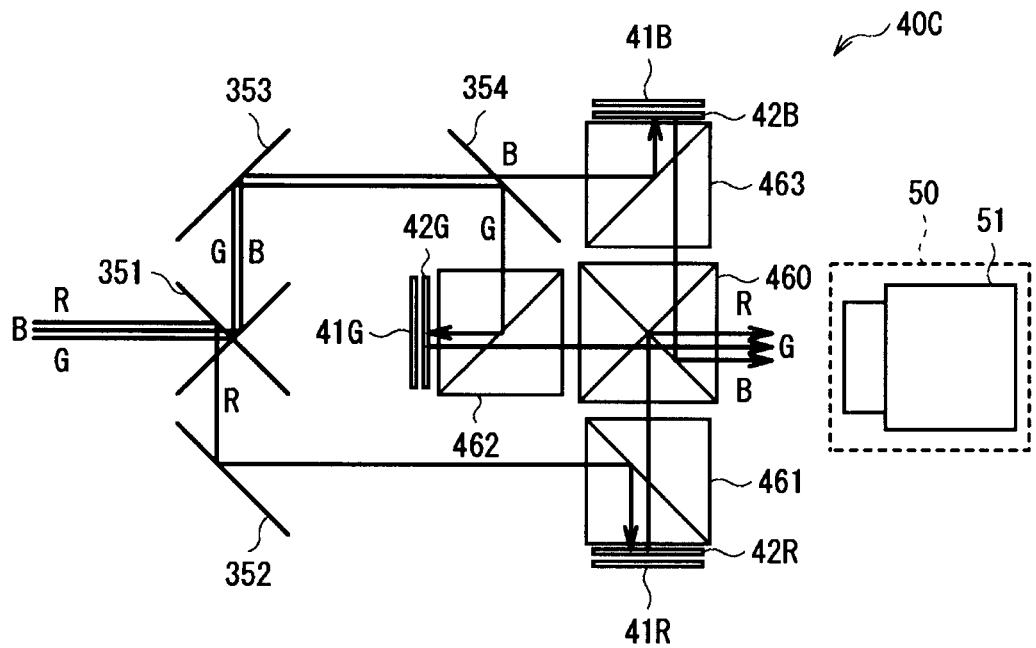
[FIG. 19]
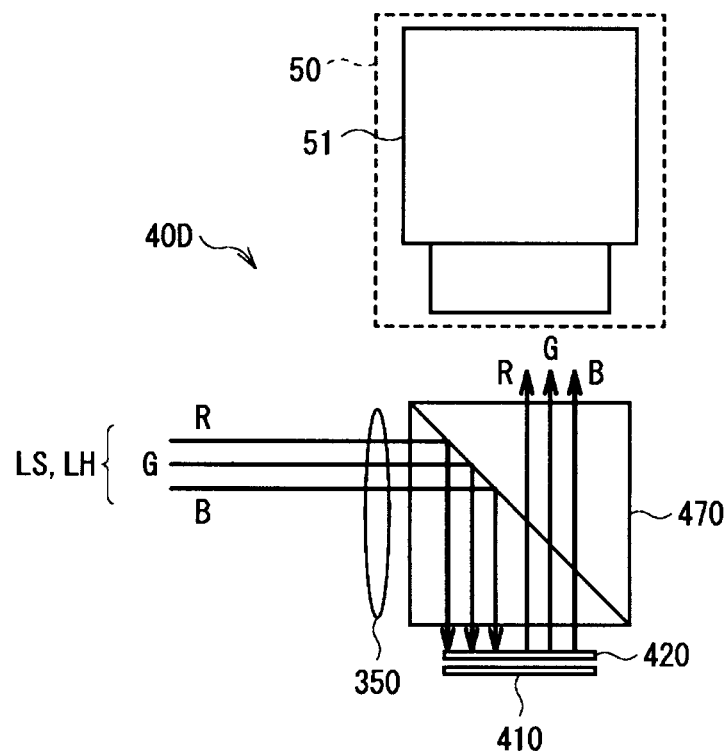

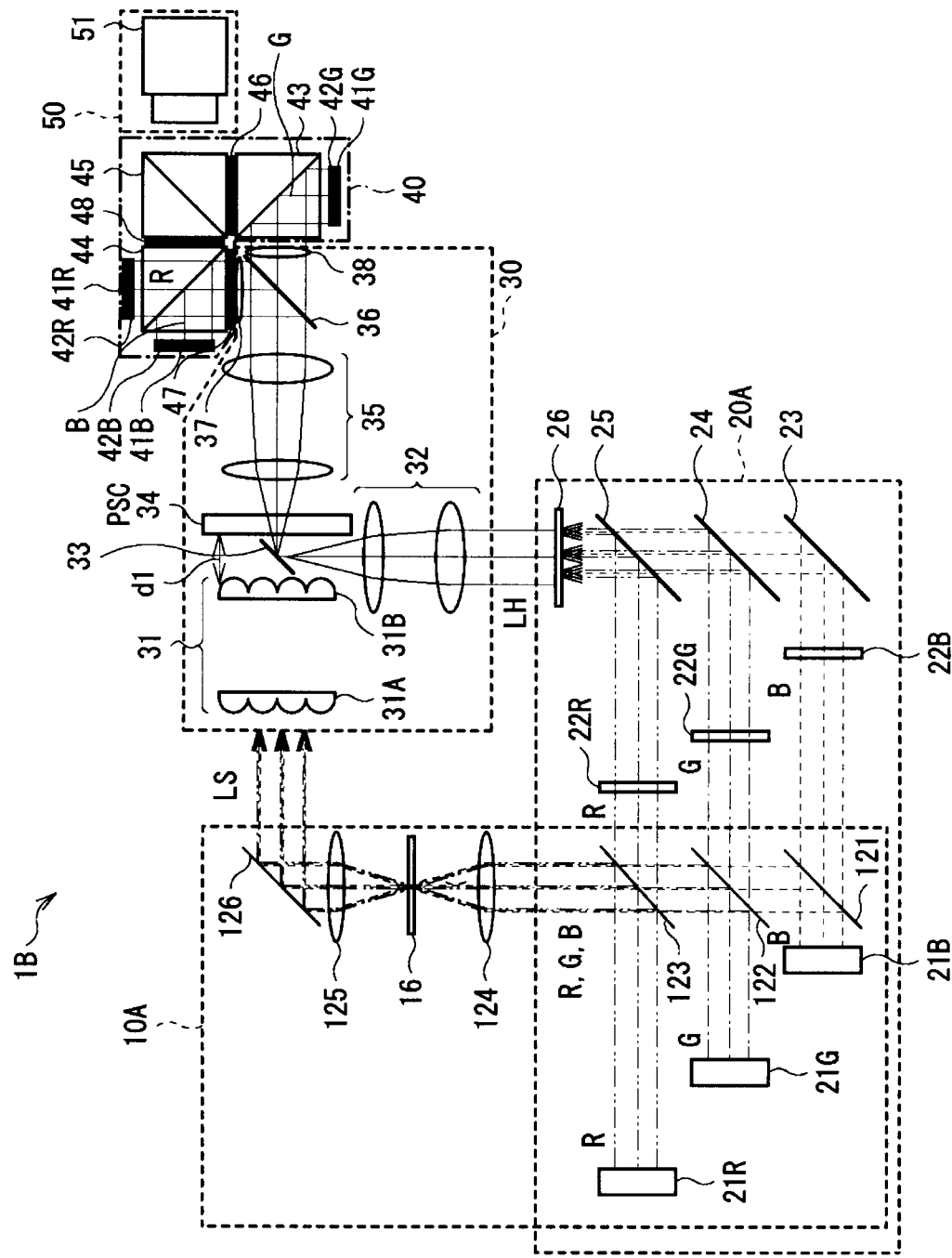
[FIG. 20]

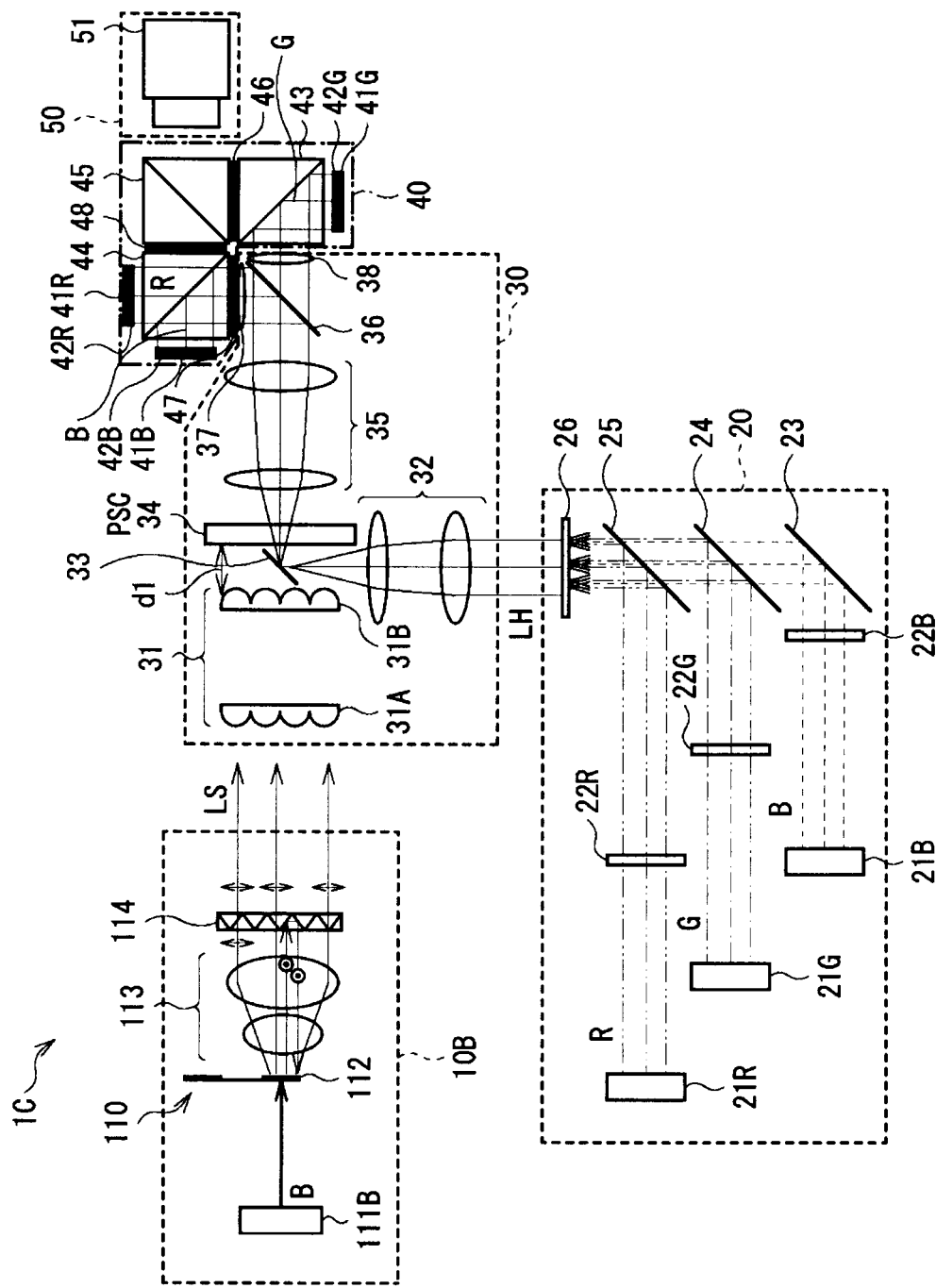
[FIG. 21]

[FIG. 22]
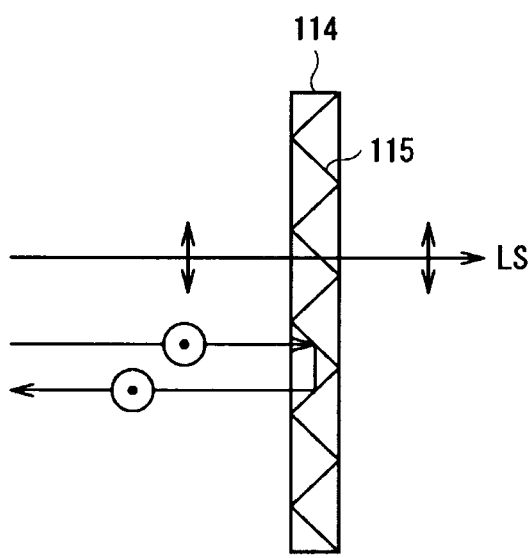

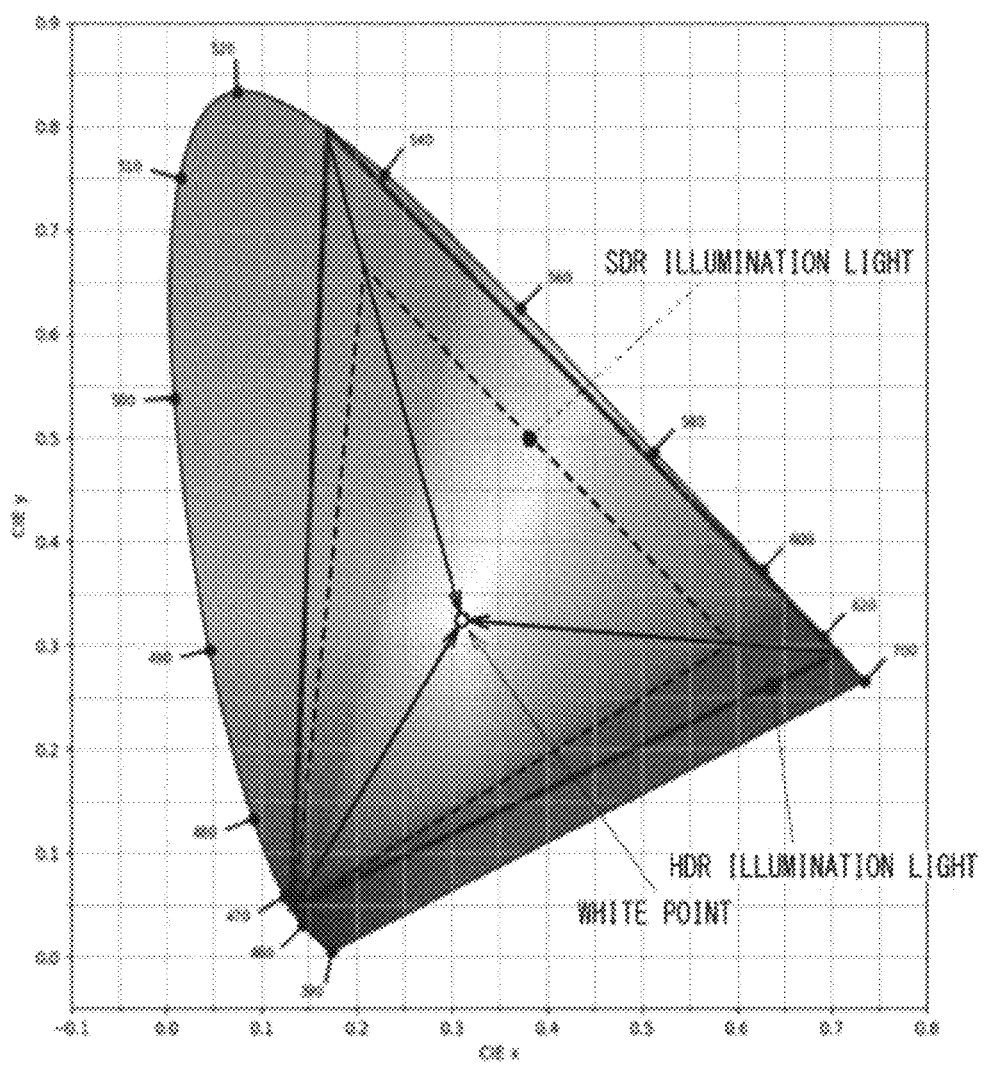
[FIG. 33]

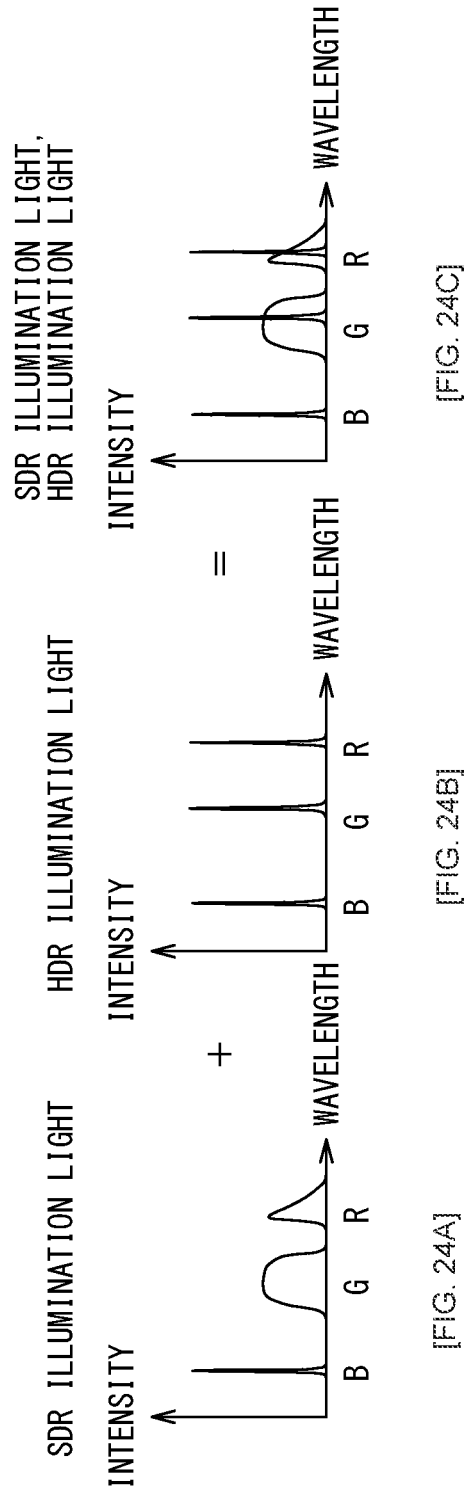

ILLUMINATION DEVICE AND DISPLAY APPARATUS

CROSS REFERENCE TO RELATED APPLICATIONS

This application is a U.S. National Phase of International Patent Application No. PCT/JP2020/047366 filed on Dec. 18, 2020, which claims priority benefit of Japanese Patent Application No. JP 2019-234675 filed in the Japan Patent Office on Dec. 25, 2019. Each of the above-referenced applications is hereby incorporated herein by reference in its entirety.

TECHNICAL FIELD

The present disclosure relates to an illumination device and a display apparatus that make it possible to achieve an HDR (High Dynamic Range).

BACKGROUND ART

A typical projector displays an image by illuminating a luminance modulation panel of a liquid crystal type, a MEMS (Micro Electro Mechanical Systems) type, or the like with SDR (Standard Dynamic Range) illumination light having uniform intensity distribution. In contrast, a HDR projector has been proposed that additionally includes a phase modulation panel on an illumination device side and uses, as illumination light, HDR illumination light having intensity distribution adapted to an image. For example, PTL 1 proposes a HDR projector using a DMD (Digital Mirror Device) as a luminance modulation panel.

CITATION LIST

Patent Literature

PTL 1: Japanese Unexamined Patent Application Publication (Published Japanese Translation of PCT Application) No. JP2018-532152

SUMMARY OF THE INVENTION

The technique disclosed in PTL 1 uses a DMD as a luminance modulation panel, and SDR illumination light and HDR illumination light are therefore not aligned in polarization. It is thus difficult to apply the technique in a case where a liquid crystal panel is used as the luminance modulation panel.

It is desirable to provide an illumination device and a display apparatus that make it possible to obtain illumination light with desired intensity distribution.

An illumination device according to an embodiment of the present disclosure includes: a first light source that outputs first illumination light subjected to phase modulation to have desired intensity distribution; a second light source that outputs second illumination light; an integrator optical system that uniformizes intensity distribution of the second illumination light; a polarization conversion element that aligns polarization directions of incident light in one polarization direction; and a reflection element disposed on an optical path between the integrator optical system and the polarization conversion element, the reflection element multiplexing the first illumination light and the second illumination light and causing each of the first illumination light and the second illumination light to enter the polarization conversion element.

A display apparatus according to an embodiment of the present disclosure includes: a first light source that outputs first illumination light subjected to phase modulation to have desired intensity distribution; a second light source that outputs second illumination light; an integrator optical system that uniformizes intensity distribution of the second illumination light; a polarization conversion element that aligns polarization directions of incident light in one polarization direction; a reflection element disposed on an optical path between the integrator optical system and the polarization conversion element, the reflection element multiplexing the first illumination light and the second illumination light and causing each of the first illumination light and the second illumination light to enter the polarization conversion element; and a luminance modulation panel that generates an image on the basis of illumination light including the first illumination light and the second illumination light outputted from the polarization conversion element.

In the illumination device or the display apparatus according to the embodiment of the present disclosure, the first illumination light and the second illumination light are multiplexed by the reflection element disposed on the optical path between the integrator optical system and the polarization conversion element, to enter the polarization conversion element.

BRIEF DESCRIPTION OF DRAWINGS

FIG. 1 is an overall configuration diagram illustrating a configuration example of a projector serving as a display apparatus according to a first embodiment of the present disclosure.

FIG. 2 is an explanatory diagram illustrating an example of an optical action of a reflective polarizer in the projector illustrated in FIG. 1.

FIG. 3 is an explanatory diagram illustrating a specific configuration example and an example of an optical action of a PS converter in the projector illustrated in FIG. 1.

FIG. 4 is an explanatory diagram illustrating an example of a chromaticity range of SDR illumination light and a chromaticity range of HDR illumination light in the projector illustrated in FIG. 1.

FIGS. 5A and 5B are explanatory diagrams illustrating an example of a region where the HDR illumination light enters in a first configuration example of the PS converter in the projector illustrated in FIG. 1.

FIGS. 6A and 6B are explanatory diagrams illustrating an example of a region where the HDR illumination light enters in a second configuration example of the PS converter in the projector illustrated in FIG. 1.

FIG. 7 is an explanatory diagram illustrating an example of a state in which the HDR illumination light enters a central part in one opening region of the PS converter in the projector illustrated in FIG. 1.

FIG. 8 is an explanatory diagram illustrating an example of a passing state of the SDR illumination light and the HDR illumination light through the projection lens in a case where the HDR illumination light is caused to enter the central part in one opening region of the PS converter.

FIG. 9 is an explanatory diagram illustrating an example of angle distribution of the SDR illumination light and the HDR illumination light on a luminance modulation panel in the case where the HDR illumination light is caused to enter the central part in one opening region of the PS converter.

FIG. 10 is an explanatory diagram illustrating an example of a state of vignetting of light rays due to optical components around the reflective polarizer in the case where the HDR illumination light is caused to enter the central part in one opening region of the PS converter.

FIG. 11 is an explanatory diagram illustrating an example of a state in which the HDR illumination light enters an end part in one opening region of the PS converter in the projector illustrated in FIG. 1.

FIG. 12 is an explanatory diagram illustrating an example of a passing state of the SDR illumination light and the HDR illumination light through the projection lens in a case where the HDR illumination light is caused to enter the end part in one opening region of the PS converter.

FIG. 13 is an explanatory diagram illustrating an example of angle distribution of the SDR illumination light and the HDR illumination light on a luminance modulation panel in the case where the HDR illumination light is caused to enter the end part in one opening region of the PS converter.

FIG. 14 is an explanatory diagram illustrating an example of a state of vignetting of light rays due to optical components around the reflective polarizer in the case where the HDR illumination light is caused to enter the end part in one opening region of the PS converter.

FIG. 15 is a configuration diagram illustrating a configuration example of a main part of a projector serving as a display apparatus according to a second embodiment.

FIG. 16 is a configuration diagram illustrating a main part of a first configuration example of a projector serving as a display apparatus according to a third embodiment.

FIG. 17 is a configuration diagram illustrating a main part of a second configuration example of the projector serving as the display apparatus according to the third embodiment.

FIG. 18 is a configuration diagram illustrating a main part of a third configuration example of the projector serving as the display apparatus according to the third embodiment.

FIG. 19 is a configuration diagram illustrating a configuration example of a main part of a projector serving as a display apparatus according to a fourth embodiment.

FIG. 20 is an overall configuration diagram illustrating a configuration example of a projector serving as a display apparatus according to a fifth embodiment.

FIG. 21 is an overall configuration diagram illustrating a configuration example of a projector serving as a display apparatus according to a sixth embodiment.

FIG. 22 is an explanatory diagram illustrating an example of an optical action of a polarization recycling element in the projector illustrated in FIG. 21.

FIG. 23 is an explanatory diagram illustrating an example of a chromaticity range of SDR illumination light and a chromaticity range of HDR illumination light in the projector illustrated in FIG. 21.

FIGS. 24A, 24B, and 24C are explanatory diagrams illustrating an example of a wavelength spectrum of the SDR illumination light and a wavelength spectrum of the HDR illumination light in the projector illustrated in FIG. 21.

MODES FOR CARRYING OUT THE INVENTION

In the following, description is given of embodiments of the present disclosure in detail with reference to the drawings. It is to be noted that the description is given in the following order.

0. Comparative Example
1. First Embodiment (a display apparatus that uses a reflective polarizer to multiplex HDR illumination light and SDR) (FIG. 1, 2, 3, 4, 5A, 5B, 6A, 6B, 7, 8, 9, 10, 11, 12, 13, and 14)
   1.1 Overall Configuration and Operation of Display Apparatus According to First Embodiment
   1.2 Configuration and Action of Main Part of Display Apparatus According to First Embodiment
   1.3 Effects
   1.4 Modification Examples
2. Second Embodiment (a display apparatus that uses a mirror to multiplex HDR illumination light and SDR) (FIG. 15)
3. Third Embodiment (a variation of a panel core) (FIG. 16 to FIG. 18)
4. Fourth Embodiment (a variation of a panel core) (FIG. 19)
5. Fifth Embodiment (a display apparatus that uses the same laser light source to generate HDR illumination light and SDR illumination light) (FIG. 20)
6. Sixth Embodiment (a display apparatus that uses a phosphor light source to generate SDR illumination light) (FIGS. 21, 22, 23, 24A, 24B, and 24C)
7. Other Embodiments

0. COMPARATIVE EXAMPLE

A typical projector displays an image by illuminating a luminance modulation panel of a liquid crystal type, a MEMS type, or the like with SDR illumination light having uniform intensity distribution. Therefore, the maximum luminance expressible by the projector has been constant regardless of the image. Moreover, the illumination light applied to a dark portion of the image has been blocked to be wasted.

In contrast, a HDR projector has been proposed that additionally includes a phase modulation panel on an illumination device side and uses, as illumination light, HDR illumination light having intensity distribution adapted to an image. For example, PTL 1 proposes a HDR projector using a DMD (Digital Mirror Device) as a luminance modulation panel. The HDR projector illuminates the luminance modulation panel with HDR illumination light having intensity distribution adapted to the image. This makes it possible to assign light that has typically been blocked to a bright place of the image, making it possible to raise the expressible maximum luminance.

Here, in terms of a decrease in efficiency due to reflectance of a phase modulation panel, etc., consideration is given to the following HDR projector. In the HDR projector, HDR illumination light with intensity distribution given by the phase modulation panel is used as only a portion of illumination light, and uniform illumination light (SDR illumination light) is used as the rest of the illumination light as in an existing technique, to be applied to a luminance modulation panel. In addition, consideration is given to a HDR liquid crystal projector that uses a liquid crystal panel as the luminance modulation panel. In this case, it is necessary to multiplex the SDR illumination light and the HDR illumination light somewhere, and thereafter apply the SDR illumination light and the HDR illumination light to the liquid crystal panel for luminance modulation.

A typical liquid crystal projector necessitates an integrator optical system including a fly-eye lens and a polarization conversion element (PS converter (PSC)), to allow light reaching a liquid crystal panel for luminance modulation to have uniform intensity and be aligned in polarization. Also in a case of the HDR liquid crystal projector, the integrator optical system is necessary for the SDR illumination light. On the other hand, it is necessary to cause the HDR illumination light to reach the liquid crystal panel for luminance modulation without disturbing the phase modulated by the phase modulation panel. Consequently, it is desired to multiplex the HDR illumination light with the SDR illumination light, while avoiding the integrator optical system that disturbs the phase.

In addition, if HDR illumination light is superimposed on SDR illumination light, the HDR illumination light dynamically changes in intensity with respect to the SDR illumination light having constant intensity; it is necessary to prevent a chromaticity point from shifting if a ratio of the HDR illumination light changes with respect to the SDR illumination light. Therefore, in a case of a method of multiplexing wavelengths by using light having different spectra between the SDR illumination light and the HDR illumination light, for example, a chromaticity point shift is caused by the ratio of the HDR illumination light changing with respect to the SDR illumination light in an image.

In addition, in multiplexing SDR illumination light and HDR illumination light, it is necessary to prevent a decrease in efficiency. As a conceivable multiplexing method that does not cause the chromaticity point shift described above, a mirror or the like may be disposed on an optical path of the SDR illumination light to spatially multiplex the HDR illumination light. However, in a case of this method, the SDR illumination light incident on the mirror region is vignetted, resulting in a decrease in efficiency.

1. FIRST EMBODIMENT

1.1 Overall Configuration and Operation of Display Apparatus According to First Embodiment FIG. 1 illustrates an overall configuration example of a projector 1 serving as a display apparatus according to a first embodiment of the present disclosure.

The projector 1 according to the first embodiment includes an illumination device that generates illumination light including HDR illumination light LH and SDR illumination light LS, and a panel core 40 that generates an image on the basis of the illumination light generated by the illumination device. In addition, the projector 1 includes a projection optical system 50 that projects the image generated by the panel core 40 on a projection surface such as an unillustrated screen.

The illumination device includes a SDR light source 10 that generates the SDR illumination light LS, a HDR light source 20 that generates the HDR illumination light LH, and an illumination optical system 30 that multiplexes the SDR illumination light LS and the HDR illumination light LH to generate the illumination light for the panel core 40.

The SDR light source 10 generates the SDR illumination light LS and outputs the SDR illumination light LS toward the illumination optical system 30. The SDR light source 10 includes: a red LD 11R, a green LD 11G, and a blue LD 11B; a mirror 12; a dichroic mirror 13; a dichroic mirror 14; a lens 15; a diffuser 16; and a lens 17.

The HDR light source 20 outputs the HDR illumination light LH subjected to phase modulation to have desired intensity distribution toward the illumination optical system 30. The HDR light source 20 includes: a red LD 21R, a green LD 21G, and a blue LD 21B; a phase modulation panel for red 22R, a phase modulation panel for green 22G, and a phase modulation panel for blue 22B; a mirror 23; a dichroic mirror 24; a dichroic mirror 25; and a diffuser 26.

The illumination optical system 30 includes an integrator optical system 31, a lens 32, a reflective polarizer 33, a PS converter (PSC) 34, a lens 35, a dichroic mirror 36, a lens 37, and a lens 38. The integrator optical system 31 includes a pair of a first fly-eye lens 31A and a second fly-eye lens 31B.

The panel core 40 includes: a luminance modulation panel for red 41R, a luminance modulation panel for green 41G, and a luminance modulation panel for blue 41B; and a retarder for red 42R, a retarder for green 42G, and a retarder for blue 42B. In addition, the panel core 40 includes: a PBS (polarization beam splitter) 43, a PBS 44, and a PBS 45; a half-wave plate 46; a color select 47; and a color select 48.

The projection optical system 50 includes a projection lens 51.

It is to be noted that, in the first embodiment, the HDR illumination light LH corresponds to a specific example of "first illumination light" in the technology of the present disclosure. In addition, the HDR light source 20 corresponds to a specific example of a "first light source" in the technology of the present disclosure. In addition, the SDR illumination light LS corresponds to a specific example of "second illumination light" in the technology of the present disclosure. In addition, the SDR light source 10 corresponds to a specific example of a "second light source" in the technology of the present disclosure. In addition, the red LD 21R, the green LD 21G, and the blue LD 21B correspond to a specific example of a "first plurality of laser light sources" in the technology of the present disclosure. In addition, the red LD 11R, the green LD 11G, and the blue LD 11B correspond to a specific example of a "second plurality of laser light sources" in the technology of the present disclosure. In addition, in the first embodiment, the reflective polarizer 33 corresponds to a specific example of a "reflection element" in the technology of the present disclosure.

In the SDR light source 10, the red LD 11R is a laser diode that emits red light for the SDR illumination light LS. The green LD 11G is a laser diode that emits green light for the SDR illumination light LS. The blue LD 11B is a laser diode that emits blue light for the SDR illumination light LS. In the HDR light source 20, the red LD 21R is a laser diode that emits red light for the HDR illumination light LH. The green LD 21G is a laser diode that emits green light for the HDR illumination light LH. The blue LD 21B is a laser diode that emits blue light for the HDR illumination light LH.

The red LD 11R, the green LD 11G, and the blue LD 11B in the SDR light source 10 may each be a laser diode that emits color light with the same wavelength as the corresponding one of the red LD 21R, the green LD 21G, and the blue LD 21B in the HDR light source 20. It is desired that the red LD 11R, the green LD 11G, and the blue LD 11B in the SDR light source 10 each have a narrow-band property with an aligned polarization direction. Similarly, it is desired that the red LD 21R, the green LD 21G, and the blue LD 21B in the HDR light source 20 each have a narrow-band property with an aligned polarization direction. However, as will be described later, to multiplex the HDR illumination light LH and the SDR illumination light LS in the reflective polarizer 33 of the illumination optical system 30, it is desired that the polarization direction of the HDR illumination light LH that is outputted from the HDR light source 20 and the polarization direction of the SDR illumination light LS that is outputted from the SDR light source 10 be different from each other.

In the SDR light source 10, the mirror 12 is disposed on an optical path of the red light that is emitted by the red LD 11R, and reflects the red light toward the dichroic mirror 13.

The dichroic mirror 13 and the dichroic mirror 14 have a property of exhibiting different reflectance and transmittance depending on wavelength, and are used to combine the red light, the green light, and the blue light in the SDR light source 10. The dichroic mirror 13 is disposed on an optical path of the green light that is emitted by the green LD 11G, and transmits the red light and reflects the green light toward the dichroic mirror 14. The dichroic mirror 14 is disposed on an optical path of the blue light that is emitted by the blue LD 11B, and transmits the red light and the green light and reflects the blue light toward the lens 15.

The lens 15 is disposed on an optical path of the red light, the green light, and the blue light outputted from the dichroic mirror 14, and condenses the red light, the green light, and the blue light outputted from the dichroic mirror 14 toward the diffuser 16.

The diffuser 16 is disposed on an optical path of the red light, the green light, and the blue light outputted from the lens 15. The diffuser 16 reduces speckle of the red light, the green light, and the blue light outputted from the lens 15, and outputs the red light, the green light, and the blue light toward the lens 17.

The red light, the green light, and the blue light outputted from the diffuser 16 are outputted, via the lens 17, toward the illumination optical system 30 as the SDR illumination light LS.

In the HDR light source 20, the phase modulation panel for red 22R is disposed on an optical path of the red light that is emitted by the red LD 21R. The phase modulation panel for green 22G is disposed on an optical path of the green light that is emitted by the green LD 21G. The phase modulation panel for blue 22B is disposed on an optical path of the blue light that is emitted by the blue LD 21B. The phase modulation panel for red 22R, the phase modulation panel for green 22G, and the phase modulation panel for blue 22B are each a device that is able to change an amount of phase modulation for each pixel. The phase modulation panel for red 22R, the phase modulation panel for green 22G, and the phase modulation panel for blue 22B are each used to give the desired intensity distribution to the HDR illumination light LH of each color for a panel surface of the corresponding one of the luminance modulation panel for red 41R, the luminance modulation panel for green 41G, and the luminance modulation panel for blue 41B of the panel core 40. In the projector 1 according to the first embodiment, the phase modulation panel for red 22R, the phase modulation panel for green 22G, and the phase modulation panel for blue 22B are each a transmissive liquid crystal panel, for example.

The mirror 23 is disposed on an optical path of the blue light outputted from the phase modulation panel for blue 22B, and reflects the blue light toward the dichroic mirror 24.

The dichroic mirror 24 and the dichroic mirror 25 have a property of exhibiting different reflectance and transmittance depending on wavelength, and are used to combine the red light, the green light, and the blue light in the HDR light source 20. The dichroic mirror 24 is disposed on an optical path of the green light outputted from the phase modulation panel for green 22G, and transmits the blue light and reflects the green light toward the dichroic mirror 25. The dichroic mirror 25 is disposed on an optical path of the red light outputted from the phase modulation panel for red 22R, and transmits the blue light and the green light and reflects the red light toward the diffuser 26.

The diffuser 26 is disposed on an optical path of the red light, the green light, and the blue light outputted from the dichroic mirror 25. The diffuser 26 reduces speckle of the red light, the green light, and the blue light outputted from the dichroic mirror 25, and outputs the red light, the green light, and the blue light toward the illumination optical system 30.

In the illumination optical system 30, the integrator optical system 31 uniformizes intensity distribution of the SDR illumination light LS, and outputs the SDR illumination light LS toward the reflective polarizer 33 and the PSC 34.

The lens 32 condenses the HDR illumination light LH outputted from the HDR light source 20 toward the reflective polarizer 33.

The reflective polarizer 33 is an element having different transmittance and reflectance depending on polarization direction, and is used to multiplex the SDR illumination light LS and the HDR illumination light LH. The reflective polarizer 33 is disposed on an optical path between the integrator optical system 31 and the PSC 34. The reflective polarizer 33 multiplexes the HDR illumination light LH and the SDR illumination light LS, and causes each of the HDR illumination light LH and the SDR illumination light LS to enter the PSC 34.

The PSC 34 is a polarization conversion element that aligns polarization directions of incident light in one polarization direction. The PSC 34 aligns polarization directions of the HDR illumination light LH and the SDR illumination light LS in one polarization direction, and outputs the HDR illumination light LH and the SDR illumination light LS toward the lens 35.

The lens 35 outputs the HDR illumination light LH and the SDR illumination light LS outputted from the PSC 34 toward the dichroic mirror 36.

The dichroic mirror 36 splits each of the HDR illumination light LH and the SDR illumination light LS outputted from the lens 35 into red light and blue light, and green light, and outputs the red light and the blue light, and the green light.

The red light and the blue light outputted from the dichroic mirror 36 enter the panel core 40 via the lens 37. The green light outputted from the dichroic mirror 36 enters the panel core 40 via the lens 38.

In the panel core 40, the red light enters the luminance modulation panel for red 41R via the color select 47, the PBS 44, and the retarder for red 42R. Red image light generated by the luminance modulation panel for red 41R enters the PBS 45 via the retarder for red 42R, the PBS 44, and the color select 48.

The blue light enters the luminance modulation panel for blue 41B via the color select 47, the PBS 44, and the retarder for blue 42B. Blue image light generated by the luminance modulation panel for blue 41B enters the PBS 45 via the retarder for blue 42B, the PBS 44, and the color select 48.

The green light enters the luminance modulation panel for green 41G via the PBS 43 and the retarder for green 42G. Green image light generated by the luminance modulation panel for green 41G enters the PBS 45 via the retarder for green 42G, the PBS 43, and the half-wave plate 46.

The PBS 45 combines the image light of the respective colors, and outputs the combined image light toward the projection optical system 50.

The luminance modulation panel for red 41R, the luminance modulation panel for green 41G, and the luminance modulation panel for blue 41B each generate an image on the basis of the illumination light of each color of the HDR illumination light LH and the SDR illumination light LS. In the projector 1 according to the first embodiment, the luminance modulation panel for red 41R, the luminance modulation panel for green 41G, and the luminance modulation panel for blue 41B are each a reflective liquid crystal panel, for example.

The retarder for red 42R, the retarder for green 42G, and the retarder for blue 42B are quarter-wave plates, for example. The retarder for red 42R, the retarder for green 42G, and the retarder for blue 42B are respectively used to compensate for small phase differences due to pretilt of liquid crystal in the luminance modulation panel for red 41R, the luminance modulation panel for green 41G, and the luminance modulation panel for blue 41B. The use of the retarder for red 42R, the retarder for green 42G, and the retarder for blue 42B improves contrast.

The PBS 43, the PBS 44, and the PBS 45 each have a plane of polarization. The PBS 43, the PBS 44, and the PBS 45 each transmit light that is P-polarized with respect to the plane of polarization, and reflect light that is S-polarized with respect to the plane of polarization.

The half-wave plate 46 is an optical element that retards the phase by $\lambda/2$, and is disposed to rotate the polarization of the green light by 90 degrees.

The color select 47 and the color select 48 are wave plates that work on only a specific wavelength, and are disposed to rotate the polarization of only the red light by 90 degrees.

The projection lens 51 includes a plurality of lenses that project the images generated by the luminance modulation panel for red 41R, the luminance modulation panel for green 41G, and the luminance modulation panel for blue 41B of the panel core 40 on the projection surface such as the unillustrated screen.

In the projector 1, the SDR illumination light LS outputted from the SDR light source 10 passes through the integrator optical system 31 of the illumination optical system 30, and thereafter is aligned in the same polarization direction as the HDR illumination light LH by the PSC 34. Respective color light beams of the SDR illumination light LS outputted from the illumination optical system 30 enter the panel core 40 to uniformly illuminate the luminance modulation panel for red 41R, the luminance modulation panel for green 41G, and the luminance modulation panel for blue 41B.

Respective color light beams outputted from the HDR light source 20 enter the phase modulation panel for red 22R, the phase modulation panel for green 22G, and the phase modulation panel for blue 22B, and are subjected to the phase modulation to generate the desired intensity distribution on a diffusion surface of the diffuser 26. The respective color light beams of the HDR illumination light LH having the desired intensity distribution generated on the diffusion surface pass through the illumination optical system 30 to enter the panel core 40, forming images on the respective panel surfaces of the luminance modulation panel for red 41R, the luminance modulation panel for green 41G, and the luminance modulation panel for blue 41B. The HDR illumination light LH is reflected by the reflective polarizer 33 disposed between the integrator optical system 31 and the PSC 34 to be multiplexed with the SDR illumination light LS. Thereafter, the HDR illumination light LH is transmitted through the PSC 34 as it is to be outputted from the PSC 34 with the same polarization as the SDR illumination light LS. In the panel core 40, the respective panel surfaces of the luminance modulation panel for red 41R, the luminance modulation panel for green 41G, and the luminance modulation panel for blue 41B are illuminated with the respective color light beams of the HDR illumination light LH outputted from the illumination optical system 30 and having the desired intensity distribution.

The light outputted from the panel core 40 is projected on the projection surface such as the unillustrated screen by the projection lens 51.

1.2 Configuration and Action of Main Part of Display Apparatus According to First Embodiment

Action of Reflective Polarizer 33

FIG. 2 illustrates an example of an optical action of the reflective polarizer 33 in the projector 1 illustrated in FIG. 1.

In the projector 1, the polarization direction of the HDR illumination light LH that is outputted from the HDR light source 20 and the polarization direction of the SDR illumination light LS that is outputted from the SDR light source 10 are different from each other. The SDR illumination light LS enters the reflective polarizer 33 in a state of P-polarized light, for example. The HDR illumination light LH enters the reflective polarizer 33 in a state of S-polarized light, for example. On the basis of a difference between the polarization directions, the reflective polarizer 33 reflects the HDR illumination light LH toward the PSC 34, and transmits the SDR illumination light LS toward the PSC 34.

The reflective polarizer 33 transmits all of the SDR illumination light LS that is P-polarized with respect to the reflective polarizer 33, and reflects all of the HDR illumination light LH that is S-polarized with respect to the reflective polarizer 33. Therefore, in the projector 1, substantially no light is spatially vignetted by the reflective polarizer 33, which indicates high efficiency.

In the projector 1, as described above, the SDR illumination light LS made into uniform illumination light by passing through the integrator optical system 31 and the HDR illumination light LH subjected to the phase modulation to have the desired intensity distribution are subjected to polarization multiplexing by the reflective polarizer 33 installed between the integrator optical system 31 and the PSC 34. After the SDR illumination light LS and the HDR illumination light LH are multiplexed by the reflective polarizer 33, the SDR illumination light LS and the HDR illumination light LH are aligned in polarization by the PSC 34.

Specific Configuration Example and Optical Action of PSC 34

FIG. 3 illustrates a specific configuration example and an example of an optical action of the PSC 34 in the projector 1 illustrated in FIG. 1.

The PSC 34 includes a polarization film 341, a half-wave plate 342, a shielding region 343, and an opening region 344.

The PSC 34 includes the plurality of shielding regions 343 and the plurality of opening regions 344 alternately provided on an input surface. The polarization film 341 has a property of transmitting P-polarized light and reflecting S-polarized light. The plurality of half-wave plates 342 are provided in regions corresponding to the shielding regions 343 on an output surface side of the PSC 34. The half-wave plate 342 converts S-polarized light into P-polarized light.

In the projector 1, after the HDR illumination light LH and the SDR illumination light LS are multiplexed by the reflective polarizer 33, differently polarized light rays enter the PSC 34. The HDR illumination light LH enters the PSC 34 with P-polarization, for example, and is therefore transmitted through the PSC 34 as it is to be outputted without being changed from P-polarized light. On the other hand, the SDR illumination light LS enters the PSC 34 with S-polarization, for example. The SDR illumination light LS is therefore reflected twice within the PSC 34, proceeds to a path including the half-wave plate 342, and has its polarization rotated to be outputted as P-polarized light. Thus, the differently polarized HDR illumination light LH and SDR illumination light LS have their polarization aligned as a result of being transmitted through the PSC 34.

In this manner, in the projector 1, the HDR illumination light LH and the SDR illumination light LS have their polarization aligned as a result of being transmitted through the PSC 34. This makes it possible to use a liquid crystal panel to configure each of the luminance modulation panel for red 41R, the luminance modulation panel for green 41G, and the luminance modulation panel for blue 41B in the panel core 40. In the projector 1, it is possible to use a liquid crystal panel instead of a DMD, for example, as the luminance modulation panel, which means that a reduction in cost is expectable.

Chromaticity Range of HDR Illumination Light LH and Chromaticity Range of SDR Illumination Light LS FIG. 4 illustrates an example of a chromaticity range of the SDR illumination light LS and a chromaticity range of the HDR illumination light LH in the projector 1 illustrated in FIG. 1. In FIG. 4, the example of the chromaticity range of the SDR illumination light LS and the chromaticity range of the HDR illumination light LH is expressed on a xy chromaticity diagram of CIE 1931 color space defined by CIE (Commission Internationale de l'Eclairage).

In the projector 1, the red LD 11R, the green LD 11G, and the blue LD 11B in the SDR light source 10 may each be a laser diode that emits color light with the same wavelength as the corresponding one of the red LD 21R, the green LD 21G, and the blue LD 21B in the HDR light source 20.

The intensity distribution of the HDR illumination light LH changes in accordance with an image to be displayed by the projector 1, resulting in a change in a ratio of the HDR illumination light LH with respect to the SDR illumination light LS which is uniform illumination. To prevent a chromaticity point from shifting even if this ratio changes, it is necessary to make the SDR illumination light LS and the HDR illumination light LH have the same wavelength spectrum. The polarization multiplexing by the reflective polarizer 33 is independent of the wavelength of light rays to be multiplexed, which allows for multiplexing even if the light rays have completely the same wavelength spectrum. Accordingly, in this multiplexing method, if the HDR illumination light LH is superimposed on the SDR illumination light LS, a change in the ratio therebetween in the image does not cause the chromaticity point to shift.

In the projector 1, it is unnecessary to consider a chromaticity point shift in the image, which reduces the burden of image processing. Furthermore, it is possible to use light with the same wavelength between the SDR illumination light LS and the HDR illumination light LH, which makes it easier to satisfy a color gamut standard, such as Rec.709 or Rec.2020.

Concerning Region where HDR Illumination Light LH Enters in PSC 34

FIGS. 5A and 5B illustrate an example of a region where the HDR illumination light LH enters in the PSC 34 according to a first configuration example in the projector 1 illustrated in FIG. 1. FIG. 5A is a plan view of the PSC 34, and FIG. 5B is a cross-sectional view of the PSC 34. FIGS. 6A and 6B illustrate an example of a region where the HDR illumination light LH enters in the PSC 34A according to a second configuration example in the projector 1 illustrated in FIG. 1. FIG. 6A is a plan view of the PSC 34A, and of FIG. 6B is a cross-sectional view of the PSC 34A.

The PSC 34 illustrated in FIGS. 5A and 5B have configuration of a vertically symmetrical type, and the PSC 34A illustrated in FIGS. 6A and 6B have configuration of a vertically asymmetrical type. The PSC 34 and the PSC 34A each include the plurality of opening regions 344 that allow light to enter. It is desired that the reflective polarizer 33 cause the HDR illumination light LH to enter one opening region (e.g., the opening region 344C near the center) out of the plurality of opening regions 344 in the PSC 34 or the PSC 34A.

It is desired to cause the HDR illumination light LH to reach the luminance modulation panel of the panel core 40 without disturbing the phase modulated by the phase modulation panel. Accordingly, it is desired to perform multiplexing while avoiding the integrator optical system 31 that uniformizes illumination distribution. In addition, the illumination distribution should not be branched by the PSC 34 where the HDR illumination light LH enters after the multiplexing. It is therefore desired to cause the HDR illumination light LH to enter one opening region out of the plurality of opening regions 344 in the PSC 34 or the PSC 34A.

The PSC 34 of the vertically symmetrical type illustrated in FIGS. 5A and 5B have advantage that the HDR illumination light LH is less likely to be vignetted in multiplexing, because the opening region 344C near the center is wider than in the PSC 34A of the vertically asymmetrical type illustrated in FIGS. 6A and 6B.

However, in using the wide opening region 344C near the center of the PSC 34 of the vertically symmetrical type, it is necessary to cause the HDR illumination light LH to enter the PSC 34 with P-polarization. One reason for this is that, if the HDR illumination light LH is caused to enter with S-polarization, the illumination light is branched by being reflected within the PSC 34.

Even in one opening region 344 of the PSC 34, a case where the HDR illumination light LH passes through a central part and a case where the HDR illumination light LH passes through an end part each have advantages and disadvantages.

Case of Causing HDR Illumination Light LH to Enter Central Part in One Opening Region of PSC 34

FIG. 7 illustrates an example of a state in which the HDR illumination light LH enters the central part in one opening region of the PSC 34 in the projector 1 illustrated in FIG. 1. FIG. 8 illustrates an example of a passing state of the SDR illumination light LS and the HDR illumination light LH through the projection lens 51 in a case where the HDR illumination light LH is caused to enter the central part in one opening region of the PSC 34. FIG. 9 illustrates an example of angle distribution of the SDR illumination light LS and the HDR illumination light LH on the luminance modulation panel in the panel core 40 in the case where the HDR illumination light LH is caused to enter the central part in one opening region of the PSC 34. It is to be noted that, in FIG. 9, the horizontal axis indicates an angle θx in a horizontal direction on the luminance modulation panel, and the vertical axis indicates an angle θy in a vertical direction on the luminance modulation panel. FIG. 10 illustrates an example of a state of vignetting of light rays due to optical components around the reflective polarizer 33 in a case where the HDR illumination light LH is caused to enter the central part in one opening region of the PSC 34.

In a case of causing the HDR illumination light LH to enter the central part in one opening region of the PSC 34 as illustrated in FIG. 7, one of advantages is that peripheral darkening on the projection surface (screen surface) due to optical vignetting of the projection lens 51 is less likely to occur as illustrated in FIG. 8. The peripheral darkening due to the optical vignetting of the projection lens 51 is a phenomenon in which the screen periphery becomes dark because, in a case where the angle distribution at the position of an aperture stop St is large, a light ray proceeding to the screen end is vignetted by the projection lens 51 depending on angle, even if the light ray has an angle that allows for projection at the screen center. In FIG. 8, a light ray is vignetted in a lens end part 51I, for example. If the HDR illumination light LH is caused to enter the central part of the PSC 34, the angle distribution of the HDR illumination light LH at the position of the aperture stop St becomes small. Thus, both a light ray proceeding to the center of the screen surface and a light ray proceeding to the end of the screen surface are less likely to be vignetted by the projection lens 51, which makes the peripheral darkening less likely to occur.

Another advantage is that the HDR illumination light LH is less likely to be vignetted due to a F-number of the projection lens 51 as illustrated in FIG. 9. If the HDR illumination light LH is caused to enter the central part of the PSC 34, a light ray enters the luminance modulation panel in the panel core 40 substantially vertically, which means that there is no concern that the light ray is vignetted due to the F-number of the projection lens 51.

One of disadvantages is that it is difficult to install the reflective polarizer 33 for multiplexing. A conceivable measure against this issue is, for example, making it easier to install the reflective polarizer 33 by increasing a length of the reflective polarizer 33 in a direction not causing an increase in a distance dl between the integrator optical system 31 and the PSC 34 (FIG. 10). This measure has no influence such as a decrease in efficiency, because the SDR illumination light LS is transmitted well even if the reflective polarizer 33 is made redundantly large.

Another disadvantage is that a light ray can be vignetted by an optical component, such as the second fly-eye lens 31B or the PSC 34, around the reflective polarizer 33 as illustrated in FIG. 10. To keep the efficiency of the SDR illumination light LS, it is necessary to make the distance dl between the second fly-eye lens 31B and the PSC 34 as close as possible. Some interval is necessary, however, to dispose the reflective polarizer 33. Moreover, if the reflective polarizer 33 is disposed in the central part of the PSC 34, it is necessary to further widen the interval in accordance with an angle of divergence of the HDR illumination light LH. In a case where high priority is given to the efficiency of the SDR illumination light LS, the HDR illumination light LH can be vignetted by the second fly-eye lens 31B or the PSC 34.

Case of Causing HDR Illumination Light LH to Enter End Part in One Opening Region of PSC 34

FIG. 11 illustrates an example of a state in which the HDR illumination light LH enters the end part in one opening region of the PSC 34 in the projector 1 illustrated in FIG. 1. FIG. 12 illustrates an example of a passing state of the SDR illumination light LS and the HDR illumination light LH through the projection lens 51 in a case where the HDR illumination light LH is caused to enter the end part in one opening region of the PSC 34. FIG. 13 illustrates an example of angle distribution of the SDR illumination light LS and the HDR illumination light LH on the luminance modulation panel in the panel core 40 in the case where the HDR illumination light LH is caused to enter the end part in one opening region of the PSC 34. It is to be noted that, in FIG. 13, the horizontal axis indicates an angle θx in a horizontal direction on the luminance modulation panel, and the vertical axis indicates an angle θy in a vertical direction on the luminance modulation panel. FIG. 14 illustrates an example of a state of vignetting of light rays due to optical components around the reflective polarizer 33 in a case where the HDR illumination light LH is caused to enter the end part in one opening region of the PSC 34.

In a case of causing the HDR illumination light LH to enter the end part in one opening region of the PSC 34 as illustrated in FIG. 11, basically, the advantage in the case of causing the HDR illumination light LH to enter the central part becomes a disadvantage, and the disadvantage in that case becomes an advantage.

One of advantages is that the reflective polarizer 33 for multiplexing is disposed in an end part of the PSC 34, which facilitates installation. Another advantage is that, because the reflective polarizer 33 is disposed in the end part, even if the angle distribution of the HDR illumination light LH is widened, there is less concern that the HDR illumination light LH is vignetted by a surrounding optical element such as the second fly-eye lens 31B or the PSC 34 as illustrated in FIG. 14.

One of disadvantages is that peripheral darkening on the screen surface due to optical vignetting of the projection lens 51 is likely to occur as illustrated in FIG. 12. If the HDR illumination light LH is caused to enter the end part of the PSC 34, the angle distribution at the position of the aperture stop St of the projection lens 51 becomes large. Thus, a light ray proceeding to the end part with respect to the center of the screen becomes more likely to be vignetted by the projection lens 51, which can cause the peripheral darkening. In FIG. 12, a light ray is vignetted in the lens end part 51I, for example.

Another disadvantage is that, because the HDR illumination light LH enters the luminance modulation panel of the panel core 40 with a large angle, the HDR illumination light LH can be vignetted due to the F-number of the projection lens 51 as illustrated in FIG. 13. In a case where a light ray is vignetted due to the F-number of the projection lens 51, the HDR illumination light LH can become dark as a whole.

1.3 Effects

As described above, in the illumination device and the display apparatus according to the first embodiment, the HDR illumination light LH and the SDR illumination light LS are multiplexed by the reflective polarizer 33 disposed on the optical path between the integrator optical system 31 and the PSC 34, and are caused to enter the PSC 34. This makes it possible to obtain illumination light with desired intensity distribution.

In addition, in the illumination device and the display apparatus according to the first embodiment, it is possible to multiplex the HDR illumination light LH and the SDR illumination light LS, without disturbing the phase modulated by the phase modulation panel of the HDR light source 20. The HDR illumination light LH is multiplexed with the SDR illumination light LS while avoiding the integrator optical system 31. Furthermore, in the PSC 34, the HDR illumination light LH enters one opening region of the PSC 34 so as not to be branched. In view of these, it is possible for the HDR illumination light LH to reach the luminance modulation panel of the panel core 40 without disturbing the illumination distribution generated by the phase modulation panel. Preventing the phase of the HDR illumination light LH from being disturbed allows the illumination distribution to the luminance modulation panel to be reproduced faithfully, making it possible to further raise the maximum luminance.

In addition, in the illumination device and the display apparatus according to the first embodiment, as described above, it is possible to prevent a color shift from occurring even if the ratio of the HDR illumination light LH with respect to the SDR illumination light LS changes.

In addition, in the illumination device and the display apparatus according to the first embodiment, as described above, the HDR illumination light LH and the SDR illumination light LS have their polarization aligned as a result of being transmitted through the PSC 34. This makes it possible to use a liquid crystal panel as the luminance modulation panel of the panel core 40.

In addition, in the illumination device and the display apparatus according to the first embodiment, as described above, it is possible to transmit all of the SDR illumination light LS that is P-polarized with respect to the reflective polarizer 33, and reflect all of the HDR illumination light LH that is S-polarized with respect to the reflective polarizer 33, which results in high efficiency. Introducing a multiplexing mechanism does not necessitate an increase in the number of light sources, because the efficiency does not decrease. This leads to a reduction in cost, a reduction in power consumption, and achievement of compactness.

It is to be noted that the effects described in the present specification are merely examples and not limitative, and other effects may be achieved. The same applies to effects of the following other embodiments.

1.4 Modification Examples

The above description describes an example in which red, green, and blue lasers are used for each of the SDR light source 10 and the HDR light source 20, but a laser with another wavelength such as infrared light may be used. In addition, a configuration other than three colors may be used. In addition, in the HDR light source 20, the phase modulation panel for red 22R, the phase modulation panel for green 22G, and the phase modulation panel for blue 22B may each have a configuration using a reflective liquid crystal panel, for example, without being limited to a transmissive liquid crystal panel.

2. SECOND EMBODIMENT

Next, a description is given of an illumination device and a display apparatus according to a second embodiment of the present disclosure. It is to be noted that, in the following, substantially the same portions as the components of the illumination device and the display apparatus according to the first embodiment described above are denoted with the same reference numerals, and description thereof is omitted as appropriate.

FIG. 15 illustrates a configuration example of a main part of a projector 1A serving as the display apparatus according to the second embodiment.

The projector 1A according to the second embodiment includes, in the illumination optical system 30, a mirror 33A in place of the reflective polarizer 33 in the projector 1 illustrated in FIG. 1. Other configurations may be substantially similar to those of the illumination device and the display apparatus according to the first embodiment described above.

In the second embodiment, the mirror 33A corresponds to a specific example of the "reflection element" in the technology of the present disclosure.

If a decrease in efficiency of the SDR illumination light LS is allowed, the mirror 33A may be used to multiplex the SDR illumination light LS and the HDR illumination light LH, as in the projector 1A.

3. THIRD EMBODIMENT

Next, a description is given of an illumination device and a display apparatus according to a third embodiment of the present disclosure. It is to be noted that, in the following, substantially the same portions as the components of the illumination device and the display apparatus according to the first or second embodiment described above are denoted with the same reference numerals, and description thereof is omitted as appropriate.

The luminance modulation panel that is used in the technology of the present disclosure may be a transmissive liquid crystal panel, or may be a reflective liquid crystal panel. In accordance therewith, the panel core 40 illustrated in FIG. 1 may have a configuration of a 3LCD system using a transmissive liquid crystal panel, or may have, in a case of a reflective liquid crystal panel, a configuration of a tri-core system or a 3PBS system, without being limited to a S-core system. The following describes an overview of each system.

3LCD System

FIG. 16 illustrates a main part of a first configuration example of a projector serving as the display apparatus according to the third embodiment.

The first configuration example of the projector according to the third embodiment includes a panel core 40A in place of the panel core 40 in the projector 1 illustrated in FIG. 1. The panel core 40A has a 3LCD system using a transmissive liquid crystal panel as the luminance modulation panel.

The panel core 40A includes a dichroic mirror 311, a dichroic mirror 312, a mirror 313, a mirror 314, a mirror 315, and a dichroic prism 450. In addition, the panel core 40A further includes a luminance modulation panel for red 411R, a luminance modulation panel for green 411G, and a luminance modulation panel for blue 411B.

The luminance modulation panel for red 411R, the luminance modulation panel for green 411G, and the luminance modulation panel for blue 411B are transmissive liquid crystal panels.

The luminance modulation panel for red 411R is illuminated with red light via the dichroic mirror 311, the dichroic mirror 312, the mirror 314, and the mirror 315.

The luminance modulation panel for green 411G is illuminated with green light via the dichroic mirror 311 and the mirror 313.

The luminance modulation panel for blue 411B is illuminated with blue light via the dichroic mirror 311 and the dichroic mirror 312.

Red image light generated by the luminance modulation panel for red 411R, green image light generated by the luminance modulation panel for green 411G, and blue image light generated by the luminance modulation panel for blue 411B enter the dichroic prism 450. The dichroic prism 450 combines the image light of the respective colors, and outputs the combined image light toward the projection optical system 50.

Tri-Core System

FIG. 17 illustrates a main part of a second configuration example of the projector serving as the display apparatus according to the third embodiment.

The second configuration example of the projector according to the third embodiment includes a panel core 40B in place of the panel core 40 in the projector 1 illustrated in FIG. 1. The panel core 40B has a tri-core system using a reflective liquid crystal panel as the luminance modulation panel.

The panel core 40B includes a dichroic mirror 321, a mirror 322, a lens 323, a lens 324, a dichroic mirror 325, a lens 326, a lens 327, a lens 328, and a dichroic prism 451. In addition, the panel core 40B further includes a wire grid 331, a wire grid 332, and a wire grid 333. The wire grid 331, the wire grid 332, and the wire grid 333 are optical elements having different transmittance and reflectance depending on polarization direction.

In addition, the panel core 40B further includes: the luminance modulation panel for red 41R, the luminance modulation panel for green 41G, and the luminance modulation panel for blue 41B; and the retarder for red 42R, the retarder for green 42G, and the retarder for blue 42B.

The luminance modulation panel for red 41R is illuminated with red light via the dichroic mirror 321, the mirror 322, the lens 323, the dichroic mirror 325, the lens 326, the wire grid 331, and the retarder for red 42R.

The luminance modulation panel for green 41G is illuminated with green light via the dichroic mirror 321, the mirror 322, the lens 323, the dichroic mirror 325, the lens 324, the wire grid 332, and the retarder for green 42G.

The luminance modulation panel for blue 41B is illuminated with blue light via the dichroic mirror 321, the lens 327, the lens 328, the wire grid 333, and the retarder for blue 42B.

Red image light generated by the luminance modulation panel for red 41R, green image light generated by the luminance modulation panel for green 41G, and blue image light generated by the luminance modulation panel for blue 41B enter the dichroic prism 451. The dichroic prism 451 combines the image light of the respective colors, and outputs the combined image light toward the projection optical system 50.

3PBS System

FIG. 18 illustrates a main part of a third configuration example of the projector serving as the display apparatus according to the third embodiment.

The third configuration example of the projector according to the third embodiment includes a panel core 40C in place of the panel core 40 in the projector 1 illustrated in FIG. 1. The panel core 40C has a 3PBS system using three reflective liquid crystal panels as the luminance modulation panel and including a PBS disposed for each of the three reflective liquid crystal panels.

The panel core 40C includes a dichroic mirror 351, a mirror 352, a mirror 353, and a dichroic mirror 354. In addition, the panel core 40C further includes a dichroic prism 460, a PBS 461, a PBS 462, and a PBS 463. In addition, the panel core 40C further includes: the luminance modulation panel for red 41R, the luminance modulation panel for green 41G, and the luminance modulation panel for blue 41B; and the retarder for red 42R, the retarder for green 42G, and the retarder for blue 42B.

The luminance modulation panel for red 41R is illuminated with red light via the dichroic mirror 351, the mirror 352, the PBS 461, and the retarder for red 42R.

The luminance modulation panel for green 41G is illuminated with green light via the dichroic mirror 351, the mirror 353, the dichroic mirror 354, the PBS 462, and the retarder for green 42G.

The luminance modulation panel for blue 41B is illuminated with blue light via the dichroic mirror 351, the mirror 353, the dichroic mirror 354, the PBS 463, and the retarder for blue 42B.

Red image light generated by the luminance modulation panel for red 41R, green image light generated by the luminance modulation panel for green 41G, and blue image light generated by the luminance modulation panel for blue 41B enter the dichroic prism 460. The dichroic prism 460 combines the image light of the respective colors, and outputs the combined image light toward the projection optical system 50.

Other configurations, operations, and effects may be substantially similar to those of the illumination device and the display apparatus according to the first or second embodiment described above.

4. FOURTH EMBODIMENT

Next, a description is given of an illumination device and a display apparatus according to a fourth embodiment of the present disclosure. It is to be noted that, in the following, substantially the same portions as the components of the illumination device and the display apparatus according to any of the first to third embodiments described above are denoted with the same reference numerals, and description thereof is omitted as appropriate.

In the technology of the present disclosure, the luminance modulation panel may configure a single-panel system or a two-panel system that outputs a color image by driving R, G, and B in time division. In addition, the luminance modulation panel may be a DMD.

In addition, the phase modulation panel that is used for the HDR light source in the technology of the present disclosure may be a single panel. Even in a case of a single panel, phase modulation of each of R, G, and B is achievable by time division, space division of dividing a panel region into R, G, and B, or the like.

The following describes a configuration example in a case where the luminance modulation panel configures a single-panel system.

FIG. 19 illustrates a configuration example of a main part of a projector serving as the display apparatus according to the fourth embodiment.

The projector according to the fourth embodiment includes a panel core 40D in place of the panel core 40 in the projector 1 illustrated in FIG. 1.

The panel core 40D includes a lens 350, a luminance modulation panel 410, a retarder 420, and a PBS 470. The luminance modulation panel 410 is a reflective liquid crystal panel, for example.

In the panel core 40D, red light, green light, and blue light are applied to the luminance modulation panel 410 by time division, via the lens 350, the PBS 470, and the retarder 420. The luminance modulation panel 410 generates the respective color images by time division.

The PBS 470 outputs the respective color images generated by the modulation panel 410 toward the projection optical system 50 by time division.

Other configurations, operations, and effects may be substantially similar to those of the illumination device and the display apparatus according to the first or second embodiment described above.

5. FIFTH EMBODIMENT

Next, a description is given of an illumination device and a display apparatus according to a fifth embodiment of the present disclosure. It is to be noted that, in the following, substantially the same portions as the components of the illumination device and the display apparatus according to any of the first to fourth embodiments described above are denoted with the same reference numerals, and description thereof is omitted as appropriate.

In the technology of the present disclosure, the reflection element is able to multiplex light with the same wavelength, which makes it possible to use a configuration in which the SDR illumination light LS and the HDR illumination light LH are branched from the same light source. Multiplexing light with the same wavelength means that it is possible to use the HDR illumination light LH and the SDR illumination light LS branched from the same light source, instead of preparing respective light sources having different wavelength spectra for the HDR illumination light LH and the SDR illumination light LS. This leads to a reduction in size of a projector and a reduction in cost.

FIG. 20 illustrates an overall configuration example of a projector 1B serving as the display apparatus according to the fifth embodiment.

The projector 1B according to the fifth embodiment includes a SDR light source 10A in place of the SDR light source 10 in the projector 1 illustrated in FIG. 1. In addition, the projector 1B according to the fifth embodiment includes a HDR light source 20A in place of the HDR light source 20 in the projector 1 illustrated in FIG. 1.

The HDR light source 20A further includes a dichroic mirror 121, a dichroic mirror 122, and a dichroic mirror 123, in addition to the configuration of the HDR light source 20 in the projector 1 illustrated in FIG. 1.

The SDR light source 10A shares some components with the HDR light source 20A. The SDR light source 10A includes, as the components shared with the HDR light source 20A: the red LD 21R, the green LD 21G, and the blue LD 21B; and the dichroic mirror 121, the dichroic mirror 122, and the dichroic mirror 123. In addition, the SDR light source 10A further includes the diffuser 16, a lens 124, a lens 125, and a mirror 126.

The SDR light source 10A branches the respective color light beams from the red LD 21R, the green LD 21G, and the blue LD 21B in the HDR light source 20A, by using the dichroic mirror 121, the dichroic mirror 122, and the dichroic mirror 123. The SDR light source 10A thereby generates and outputs the SDR illumination light LS including a plurality of color light beams with wavelengths different from each other.

Other configurations, operations, and effects may be substantially similar to those of the illumination device and the display apparatus according to any of the first to fourth embodiments described above.

6. SIXTH EMBODIMENT

Next, a description is given of an illumination device and a display apparatus according to a sixth embodiment of the present disclosure. It is to be noted that, in the following, substantially the same portions as the components of the illumination device and the display apparatus according to any of the first to fifth embodiments described above are denoted with the same reference numerals, and description thereof is omitted as appropriate.

In the technology of the present disclosure, because multiplexing is performed by the reflection element, the multiplexing is independent of the wavelength spectrum of each of the HDR illumination light LH and the SDR illumination light LS. Therefore, it is also possible to use a wide-wavelength-band light source, for example, a phosphor light source, for the SDR light source 10.

FIG. 21 illustrates an overall configuration example of a projector 1C serving as the display apparatus according to the sixth embodiment.

The projector 1C according to the sixth embodiment includes a SDR light source 10B in place of the SDR light source 10 in the projector 1 illustrated in FIG. 1.

The SDR light source 10B includes a phosphor wheel 110, a blue LD 111B, a lens 113, and a polarization recycling element 114.

It is to be noted that, in the sixth embodiment, the phosphor wheel 110 and the blue LD 111B correspond to a specific example of a "phosphor light source" in the technology of the present disclosure. In addition, the polarization recycling element 114 corresponds to a specific example of a "reflective polarization conversion element" in the technology of the present disclosure.

The SDR light source 10B includes the phosphor light source that emits wide-band light including a plurality of color light beams. The polarization recycling element 114 is disposed on an optical path between the phosphor light source and the reflective polarizer 33, and aligns polarization directions of the light outputted from the phosphor light source in a predetermined direction.

The phosphor wheel 110 includes a phosphor 112 serving as a wavelength conversion material. The blue LD 111B is an excitation light source that excites the phosphor 112, and emits blue light as excitation light. The phosphor 112 is excited by the blue light to emit light including red light and green light.

FIG. 22 illustrates an example of an optical action of the polarization recycling element 14 in the projector 1C illustrated in FIG. 21.

The polarization recycling element 114 includes a polarization film 115. The polarization film 115 has a property of reflecting light that is S-polarized with respect to the polarization recycling element 114, and transmitting light that is P-polarized with respect to the polarization recycling element 114.

In a case of a wide-wavelength-band light source not aligned in polarization, like the phosphor light source, it is desired to align the polarization of the SDR illumination light LS before the multiplexing with the HDR illumination light LH. Therefore, it is desired to dispose an optical element that aligns polarization, like the polarization recycling element 114 illustrated in FIG. 22, before the reflective polarizer 33 for multiplexing. The polarization recycling element 114 has a structure including a plurality of polarization beam splitters combined. The polarization recycling element 114 reflects light that is S-polarized with respect to the polarization recycling element 114, and transmits light that is P-polarized with respect to the polarization recycling element 114. The reflected S-polarized light proceeds back and forth between the wavelength conversion material and the polarization recycling element 114, until it is transmitted by becoming P-polarized light with respect to the polarization recycling element 114.

FIG. 23 illustrates an example of a chromaticity range of the SDR illumination light LS and a chromaticity range of the HDR illumination light LH in the projector 1C illustrated in FIG. 21. In FIG. 23, the example of the chromaticity range of the SDR illumination light LS and the chromaticity range of the HDR illumination light LH is expressed on a xy chromaticity diagram of CIE 1931 color space defined by CIE. FIGS. 24A, 24B, and 24C illustrate an example of a wavelength spectrum of the SDR illumination light LS (FIG. 24A) and a wavelength spectrum of the HDR illumination light LH (FIG. 24B) in the projector 1C illustrated in FIG. 21. In addition, FIG. 24C illustrates an example of wavelength spectra in a state in which the SDR illumination light LS and the HDR illumination light LH are multiplexed.

If the ratio of the HDR illumination light LH is small with respect to the SDR illumination light LS, the illumination light for the luminance modulation panel has a color gamut narrowed by being attracted to a color gamut of the phosphor light source. However, setting the chromaticity ranges of the SDR light source 10B and the HDR light source 20 to predetermined ranges makes it possible to minimize a chromaticity point shift.

In the projector 1C, as a premise, the HDR illumination light LH is able to express colors in a wide range of the xy chromaticity diagram, i.e., has a wide color gamut, because of the use of the laser light sources with narrow spectral widths. On the other hand, the SDR illumination light LS has a narrower color gamut than the HDR illumination light LH, because of the use of the phosphor light source with a relatively wide spectral width.

According to the HDR international standard BT.2020, a color gamut defined by red (630 nm), green (532 nm), and blue (467 nm) is to be expressed. It is therefore desired to use laser light sources with wavelengths close to these for the HDR light source 20. Also in the SDR light source 10B, although the color gamut is narrower, it is preferable that an apex of the color gamut be present on a straight line connecting a white point of the projector 1C and the chromaticity point of each of R, G, and B of the HDR illumination light LH, as illustrated in FIG. 23. In this manner, it is possible for the projector 1C to express a natural image, though there is a difference between the respective color gamuts of the HDR illumination light LH and the SDR illumination light LS.

Other configurations, operations, and effects may be substantially similar to those of the illumination device and the display apparatus according to any of the first to fourth embodiments described above.

7. OTHER EMBODIMENTS

The technology according to the present disclosure is not limited to the description of the above-described embodiments, and various modifications may be made.

For example, the above-described embodiments describe, as an example, the case where the illumination device is applied to the projector, and a target to be illuminated by the illumination device is the luminance modulation panel that generates an image. However, the illumination device may be applied to an apparatus other than the projector.

For example, the present technology may have the following configurations.

According to the present technology having the following configurations, the first illumination light and the second illumination light are multiplexed by the reflection element disposed on the optical path between the integrator optical system and the polarization conversion element, and are caused to enter the polarization conversion element. This makes it possible to obtain illumination light with desired intensity distribution.

For example, the present technology may have the following configurations.

(1)

An illumination device including:
  a first light source that outputs first illumination light subjected to phase modulation to have desired intensity distribution;
  a second light source that outputs second illumination light;
  an integrator optical system that uniformizes intensity distribution of the second illumination light;
  a polarization conversion element that aligns polarization directions of incident light in one polarization direction; and
  a reflection element disposed on an optical path between the integrator optical system and the polarization conversion element, the reflection element multiplexing the first illumination light and the second illumination light and causing each of the first illumination light and the second illumination light to enter the polarization conversion element.

(2)

The illumination device according to (1), in which the reflection element includes a reflective polarizer.

(3)

The illumination device according to (2), in which
  a polarization direction of the first illumination light outputted from the first light source and a polarization direction of the second illumination light outputted from the second light source are different from each other, and
  the reflective polarizer reflects the first illumination light toward the polarization conversion element and transmits the second illumination light toward the polarization conversion element, on the basis of a difference between the polarization directions.

(4)

The illumination device according to any one of (1) to (3), in which
  the polarization conversion element includes a plurality of opening regions that allow light to enter, and
  the reflection element causes the first illumination light to enter one opening region out of the plurality of opening regions in the polarization conversion element.

(5)

The illumination device according to (4), in which the reflection element causes the first illumination light to enter a central part in the one opening region in the polarization conversion element.

(6)

The illumination device according to (4), in which the reflection element causes the first illumination light to enter an end part in the one opening region in the polarization conversion element.

(7)

The illumination device according to any one of (1) to (6), in which
the first light source includes a first plurality of laser light sources that emit color light beams with wavelengths different from each other, and
the second light source includes a second plurality of laser light sources that emit color light beams with same wavelengths as the respective first plurality of laser light sources in the first light source.

(8)

The illumination device according to any one of (1) to (6), in which
the first light source includes a plurality of laser light sources that emit color light beams with wavelengths different from each other, and
the second light source branches the respective color light beams from the plurality of laser light sources in the first light source to thereby output the second illumination light including a plurality of color light beams with wavelengths different from each other.

(9)

The illumination device according to any one of (1) to (6), in which
the first light source includes a plurality of laser light sources that emit color light beams with wavelengths different from each other, and
the second light source includes a phosphor light source that emits wide-band light including a plurality of color light beams.

(10)

The illumination device according to (9), further including a reflective polarization conversion element that is disposed on an optical path between the phosphor light source and the reflection element, and aligns polarization directions of light outputted from the phosphor light source in a predetermined direction.

(11)

The illumination device according to any one of (1) to (10), in which the illumination device generates illumination light for a luminance modulation panel that generates an image.

(12)

A display apparatus including:
a first light source that outputs first illumination light subjected to phase modulation to have desired intensity distribution;
a second light source that outputs second illumination light;
an integrator optical system that uniformizes intensity distribution of the second illumination light;
a polarization conversion element that aligns polarization directions of incident light in one polarization direction;
a reflection element disposed on an optical path between the integrator optical system and the polarization conversion element, the reflection element multiplexing the first illumination light and the second illumination light and causing each of the first illumination light and the second illumination light to enter the polarization conversion element; and
a luminance modulation panel that generates an image on the basis of illumination light including the first illumination light and the second illumination light outputted from the polarization conversion element.

(13)

The display apparatus according to (12), further including a projection optical system that projects the image generated by the luminance modulation panel on a projection surface.

This application claims the benefit of Japanese Priority Patent Application No. 2019-234675 filed with the Japan Patent Office on Dec. 25, 2019, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An illumination device, comprising:
a first light source configured to output a first illumination light subjected to phase modulation to have a first intensity distribution, wherein the first illumination light has a first polarization direction;
a second light source configured to output a second illumination light, wherein
the second illumination light has a second polarization direction, and
the first polarization direction and the second polarization direction are different;
an integrator optical system configured to uniformize a second intensity distribution of the second illumination light;
a reflection element configured to multiplex the first illumination light that has the first polarization direction and the second illumination light that has the second polarization direction;
a polarization conversion element configured to align the first polarization direction of the multiplexed first illumination light and the second polarization direction of the multiplexed second illumination light in one polarization direction, wherein
the polarization conversion element includes:
a plurality of opening regions that allows the multiplexed first illumination light that has the first polarization direction and the multiplexed second illumination light that has the second polarization direction to enter the polarization conversion element, wherein
the multiplexed first illumination light that has the first polarization direction enters a first opening region of the plurality of opening regions, and
the multiplexed second illumination light that has the second polarization direction enters a second opening region of the plurality of opening regions;
a plurality of shielding regions;
a plurality of half-wave plates in regions that correspond to the plurality of shielding regions; and
a polarization film configured to:
transmit the multiplexed first illumination light that has the first polarization direction through the polarization conversion element;
reflect the multiplexed second illumination light that has the second polarization direction within the polarization conversion element, wherein the multiplexed second illumination light is reflected twice within the polarization conversion element; and direct the reflected second illumination light to a path that includes a half-wave plate of the plurality of half-wave plates, the first polarization direction of the transmitted first illumination light output from the polarization conversion element remains unchanged, and the second polarization direction of the reflected second illumination light output from the polarization conversion element is changed to the first polarization direction to align with the first polarization direction of the transmitted first illumination light.

2. The illumination device according to claim 1, wherein the reflection element comprises a reflective polarizer.

3. The illumination device according to claim 2, wherein based on a difference between the first polarization direction of the first illumination light and the second polarization direction of the second illumination light, the reflective polarizer is further configured to:
reflect the second illumination light toward the polarization conversion element; and
transmit the first illumination light toward the polarization conversion element.

4. The illumination device according to claim 1, wherein the reflection element is further configured to cause the multiplexed first illumination light to enter a central part in the first opening region of the plurality of opening regions in the polarization conversion element.

5. The illumination device according to claim 1, wherein the reflection element is further configured to cause the multiplexed first illumination light to enter an end part in the first opening region of the plurality of opening regions in the polarization conversion element.

6. The illumination device according to claim 1, wherein the first light source includes a first plurality of laser light sources configured to emit a plurality of first color light beams with a plurality of first wavelengths different from each other, and
the second light source includes a second plurality of laser light sources configured to emit a plurality of second color light beams, wherein a plurality of second wavelengths of the second plurality of laser light sources is same as the plurality of first wavelengths of the corresponding first plurality of laser light sources in the first light source.

7. The illumination device according to claim 1, wherein the first light source includes a plurality of laser light sources configured to emit a plurality of first color light beams with wavelengths different from each other, and
the second light source is configured to:
branch the plurality of first color light beams from the plurality of laser light sources in the first light source; and
output the second illumination light based on the branched plurality of first color light beams, wherein the second illumination light includes a plurality of second color light beams with wavelengths different from each other.

8. The illumination device according to claim 1, wherein the first light source includes a plurality of laser light sources configured to emit a plurality of first color light beams with wavelengths different from each other, and
the second light source includes a phosphor light source configured to emit a wide-band light that includes a plurality of second color light beams.

9. The illumination device according to claim 8, further comprising
a reflective polarization conversion element on an optical path between the phosphor light source and the reflection element, wherein
the reflective polarization conversion element is configured to align polarization directions of light output from the phosphor light source in a certain direction.

10. The illumination device according to claim 1, wherein the illumination device is configured to generate an illumination light for a luminance modulation panel configured to generate an image.

11. A display apparatus, comprising:
a first light source configured to output a first illumination light subjected to phase modulation to have a first intensity distribution, wherein the first illumination light has a first polarization direction;
a second light source configured to output a second illumination light, wherein
the second illumination light has a second polarization direction, and
the first polarization direction and the second polarization direction are different;
an integrator optical system configured to uniformize a second intensity distribution of the second illumination light;
a reflection element configured to multiplex the first illumination light that has the first polarization direction and the second illumination light that has the second polarization direction;
a polarization conversion element configured to align the first polarization direction of the multiplexed first illumination light and the second polarization direction of the multiplexed second illumination light in one polarization direction, wherein
the polarization conversion element includes:
a plurality of opening regions that allows the multiplexed first illumination light that has the first polarization direction and the multiplexed second illumination light that has the second polarization direction to enter the polarization conversion element, wherein
the multiplexed first illumination light that has the first polarization direction enters a first opening region of the plurality of opening regions, and
the multiplexed second illumination light that has the second polarization direction enters a second opening region of the plurality of opening regions;
a plurality of shielding regions;
a plurality of half-wave plates in regions that correspond to the plurality of shielding regions; and
a polarization film configured to:
transmit the multiplexed first illumination light that has the first polarization direction through the polarization conversion element;
reflect the multiplexed second illumination light that has the second polarization direction within the polarization conversion element, wherein the multiplexed second illumination light is reflected twice within the polarization conversion element; and
direct the reflected second illumination light to a path that includes a half-wave plate of the plurality of half-wave plates,
the first polarization direction of the transmitted first illumination light output from the polarization conversion element remains unchanged, and the second polarization direction of the reflected second illumination light output from the polarization conversion element is changed to the first polarization direction; and a luminance modulation panel configured to generate an image based on an illumination light that includes the first illumination light and the second illumination light output from the polarization conversion element.

12. The display apparatus according to claim 11, further comprising a projection optical system configured to project the image generated by the luminance modulation panel on a projection surface.

* * * * *